United States Patent
Soenksen

(10) Patent No.: US 7,457,446 B2
(45) Date of Patent: Nov. 25, 2008

(54) FULLY AUTOMATIC RAPID MICROSCOPE SLIDE SCANNER

(75) Inventor: Dirk G. Soenksen, Carlsbad, CA (US)

(73) Assignee: Aperio Technologies, Inc., Vista, CA (US)

( * ) Notice: Subject to any disclaimer, the term of this patent is extended or adjusted under 35 U.S.C. 154(b) by 548 days.

(21) Appl. No.: 11/173,818

(22) Filed: Jul. 1, 2005

(65) Prior Publication Data

US 2005/0270638 A1  Dec. 8, 2005

Related U.S. Application Data

(63) Continuation of application No. 10/798,457, filed on Mar. 11, 2004, now Pat. No. 6,917,696, which is a continuation of application No. 09/563,437, filed on May 3, 2000, now Pat. No. 6,711,283.

(51) Int. Cl.
  *G06K 9/00* (2006.01)
(52) U.S. Cl. ...................................... 382/128
(58) Field of Classification Search .................. 382/128
  See application file for complete search history.

(56) References Cited

U.S. PATENT DOCUMENTS

| | | |
|---|---|---|
| 3,643,015 A | 2/1972 | Davidovits et al. |
| 4,673,988 A | 6/1987 | Jansson et al. |
| 4,700,298 A | 10/1987 | Palcic et al. |
| 4,742,558 A | 5/1988 | Ishibashi et al. |
| 4,744,642 A | 5/1988 | Yoshinaga et al. |

(Continued)

FOREIGN PATENT DOCUMENTS

EP  0 339 582  4/1989

(Continued)

OTHER PUBLICATIONS

Hamilton, Eric, "JPEG File Interchange Format" Version 1.02, Sep. 1, 1992; C-Cube Microsystem, Milpitas, CA.

(Continued)

*Primary Examiner*—Tom Y Lu
(74) *Attorney, Agent, or Firm*—Pattric J. Rawlins; Procopio Cory Hargreaves & Savitch LLP

(57) ABSTRACT

Apparatus for and method of fully automatic rapid scanning and digitizing of an entire microscope sample, or a substantially large portion of a microscope sample, using a linear array detector synchronized with a positioning stage that is part of a computer controlled microscope slide scanner. The invention provides a method for composing the image strips obtained from successive scans of the sample into a single contiguous digital image. The invention also provides a method for statically displaying sub-regions of this large digital image at different magnifications, together with a reduced magnification macro-image of the entire sample. The invention further provides a method for dynamically displaying, with or without operator interaction, portions of the contiguous digital image. In one preferred embodiment of the invention, all elements of the scanner are part of a single-enclosure that has a primary connection to the Internet or to a local intranet. In this embodiment, the preferred sample type is a microscope slide and the illumination and imaging optics are consistent with transmission mode optics optimized for diffraction-limited digital imaging.

26 Claims, 6 Drawing Sheets

U.S. PATENT DOCUMENTS

| | | | |
|---|---|---|---|
| 4,760,385 A | 7/1988 | Jansson et al. | |
| 4,777,525 A | 10/1988 | Preston et al. | |
| 4,845,552 A | 7/1989 | Jaggi et al. | |
| 4,960,999 A | 10/1990 | McKean et al. | |
| 5,086,477 A | 2/1992 | Yu et al. | |
| 5,187,754 A | 2/1993 | Currin et al. | |
| 5,231,663 A | 7/1993 | Earl et al. | |
| 5,400,145 A | 3/1995 | Suita et al. | |
| 5,412,214 A | 5/1995 | Suzuki et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,672,861 A | 9/1997 | Fairley et al. | |
| 5,710,835 A | 1/1998 | Bradley | |
| 5,714,756 A | 2/1998 | Park et al. | |
| 5,790,710 A | 8/1998 | Price et al. | |
| 5,793,969 A | 8/1998 | Kamentsky et al. | |
| 5,796,861 A | 8/1998 | Vogt | |
| 5,834,758 A | 11/1998 | Trulson et al. | |
| 5,872,591 A | 2/1999 | Truc et al. | |
| 5,912,699 A | 6/1999 | Hayenga et al. | |
| 5,922,282 A | 7/1999 | Ledley | |
| 5,932,872 A * | 8/1999 | Price | 250/201.3 |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,078,681 A | 6/2000 | Silver | |
| 6,091,846 A * | 7/2000 | Lin et al. | 382/145 |
| 6,101,265 A | 8/2000 | Bacus et al. | |
| 6,272,235 B1 | 8/2001 | Bacus et al. | |
| 6,327,377 B1 | 12/2001 | Rutenberg et al. | |
| 6,330,348 B1 | 12/2001 | Kerschmann et al. | |
| 6,438,268 B1 | 8/2002 | Cockshott et al. | |
| 6,519,357 B2 | 2/2003 | Takeuchi | |
| 6,711,283 B1 | 3/2004 | Soenksen | |
| 6,714,281 B1 | 3/2004 | Amano et al. | |

FOREIGN PATENT DOCUMENTS

| | | |
|---|---|---|
| EP | 0 871 052 | 10/1998 |
| WO | 98/39728 | 9/1998 |
| WO | 98/44446 | 10/1998 |

OTHER PUBLICATIONS

Adobe Developers Association, "TIFF" Revision 6.0, Jun. 3, 1992; Adobe Systems Incorporated, Mountain View, CA.

\* cited by examiner

FULLY AUTOMATIC RAPID MICROSCOPE SLIDE SCANNER

RELATED APPLICATION

The present application is a continuation of U.S. patent application Ser. No. 10/798,457 which is a continuation of U.S. Pat. No. 6,711,283 filed May 3, 2000.

BACKGROUND

1. Field of the Invention

The present invention relates generally to the field of optical microscopy and pertains more specifically to a fully automatic rapid microscope slide scanner.

2. Related Art

One of the inherent limitations of optical microscopy is the tradeoff between the field of view, the portion of the sample that can be viewed through the eyepieces of a microscope, and the magnification at which the sample can be viewed. While higher magnification microscope objective lenses with higher numerical apertures (NA) provide the microscopist with an enlarged and often higher resolution image, the field of view decreases dramatically with increases in magnification, in proportion to the square of the magnification. Even at very low magnifications such as 1.25 times (1.25×), only a small area of a typical microscope slide can be viewed through the binoculars of a conventional microscope. The field of view limitation of optical microscopy requires that the microscopist manually scan a slide at low magnification to obtain an overall view of the sample or specimen. When an area of interest appears in one of the lower magnification fields of view, the microscopist manually selects a higher magnification objective lens to obtain an enlarged higher resolution view of a proportionately smaller area of the specimen. For samples such as histological specimens that are viewed by a pathologist, it is typical for the pathologist to frequently switch back and forth between a lower magnification objective lens with a larger field of view, for purposes of orienting himself or herself with respect to the specimen, and one or more higher magnification, smaller field of view objective lenses for purposes of viewing the sample in greater detail.

One approach to overcome the optical microscopy limitation of simultaneously achieving both a large field of view, and high magnification, is to capture multiple individual digital images from contiguous fields of view, thereby creating a large field of view image. A scanning system is used to move the sample, while a rectangular optical sensor such as an area scan charge-coupled device (CCD) camera captures an image of each field of view at the desired magnification. The process of assembling these smaller fields of view (hereinafter "image tiles") into one coherent image is called image tiling. Early image tiling systems, such as the system discussed in U.S. Pat. No. 4,760,385 (Jannson et al.) were based on creating a contiguous high resolution tiled image from approximately thirty-six individual video frame image tiles captured in a region of the sample that was previously and interactively selected by an operator. Similar but more sophisticated image tiling system have more recently become available. One such system is sold by Bacus Laboratories, Inc., Downers Grove, Ill., under the name Bacus Laboratories Inc., Slide Scanner (hereinafter "BLISS"). Elements of the BLISS system are described in Patent Cooperation Treaty publications WO 98/39728 and WO 98/44446.

The BLISS system is designed primarily for the anatomic pathologist who has a need to combine the anatomic orientation of a histological specimen that is obtained at very low magnification, together with several high magnification views of areas of the specimen that have been interactively selected by the pathologist from the low magnification tiled image, also referred to as a macro image. The BLISS system enables the pathologist to quickly flip back and forth between selected high resolution micro images of selected areas captured at 20× or 40×, and a low resolution macro image captured at 1.25×, emulating in some sense the pathologist's manual use of a conventional microscope. Alternatively, the BLISS system user interface provides separate split screens on a display monitor whereby the pathologist is shown an overall macro view and a marker showing where the current higher magnification view is located. A tiled image is constructed by assembling several adjacent, original microscope views at a first magnification to obtain an overall macro view of the specimen, together with several adjacent original microscope views at a higher magnification to create a combined data structure. The data structure is obtained by digitally scanning and storing the low magnification image tiles with their mapping coordinates and likewise, digitally scanning and storing higher magnification image tiles with their mapping coordinates. Furthermore, a pathologist may interactively select only those diagnostically significant areas of the specimen for digital scanning and storing to reduce significantly the number of image pixels stored at high resolution. The data structure, akin to a virtual microscope slide, may then be transferred to a remote viewer over a network such as the Internet. The remote user is thus provided with a series of abutted, tiled images, with each image tile being substantially equal to one small optical field of view at each of two different optical magnifications.

The BLISS system is integrated around a computer-controlled, automated microscope such as the Axioplan-2 microscope system sold by Carl Zeiss, Inc., Thornwood, N.Y. This type of high-end microscope has capabilities for computer-control of several subsystems, including the illumination subsystem, the focusing subsystem, the microscope objective lens subsystem, the filtering subsystem, as well as multiple field and condenser diaphragms or optical stops which may be used to achieve optimum Koehler illumination. Essentially, all moveable elements of the microscope can be controlled from the computer; and in principle, from a remote location via the Internet. Positions for all diaphragms and other settings such as focus and illumination level are stored by the computer, enabling microscope objective lenses to be changed without manual intervention. The BLISS system is also equipped with a computer controlled two-axis (x/y for left/right/up/down motion) translation stage that achieves 0.1 micrometer positioning accuracy using position encoders and closed-loop feedback control to provide superior positioning performance. A CCD camera with 752 by 480 pixels, and an image frame grabber are also integrated into the BLISS system.

Because it is based on image tiling, the BLISS system suffers from several known disadvantages of the image tiling approach. For example, a first disadvantage of the BLISS system is that it takes a long time, typically twenty minutes or longer to acquire the tiled data structures. These time estimates are without consideration for any additional delays that may be incurred during manual intervention, for example, prior to acquiring high magnification tiled images from selected areas of the low magnification macro image. Tiling involves moving a slide on a motorized stage, in discrete steps equal to the width of a single field of view, and with respect to a stationary area scan camera such as the CCD camera used by the BLISS system. An image tile is acquired at every step. Individual images are then tiled together to create a larger seamless image of the area of interest. Image tiling is relatively slow because of the need to minimize any significant relative motion between the sample and the camera while the image is captured. A major cause of relative motion is the settling time of the mechanical positioning stage after issuing sequential stop and go commands. To acquire images without unacceptable smearing requires waiting until the stage has settled, ideally to within less than one pixel. For example, at a 40× magnification, the width of a single image tile captured by a one-half inch format CCD camera corresponds to 160 micrometers of the sample. At this magnification, each individual pixel in a 752-pixel wide CCD camera subtends approximately 0.2 micrometers of the sample. A single tiling step thus requires a relatively large 160 micrometer movement, with associated acceleration and deceleration of the mechanical stage. In order to avoid any smearing of the image, the image tile should be captured only after the mechanical stage has settled to less than one pixel, or about 0.2 micrometers, of motion. U.S. Pat. No. 5,912,699 (Hayenga et al.) addresses this well known settling time limitation of conventional image tiling systems by proposing an alternate method that combines image tiling using conventional area scan cameras with strobe light synchronization. The slow capture times of tiling systems, including the BLISS system, limits the practical utility of image tiling to a two-step process, with extensive manual intervention between the capture of an initial very low magnification macro image and the subsequent selection of small areas for higher magnification capture.

The slow acquisition time associated with tiling systems leads to a second disadvantage of the BLISS system, that being the need for manual intervention during the process of creating the tiled data structure. After pre-scanning a slide at a very low microscope objective lens magnification of 1.25×, the BLISS operator inspects the macro-image for relevant regions of interest to be scanned using a higher magnification objective lens. While one motivation for the manual intervention may be to limit the size of the final data structure, manual intervention is absolutely essential to define smaller areas which can be acquired in a reasonable time. For example, it would not be practical, because of acquisition time considerations, to use the BLISS system to scan an entire microscope slide at 20× magnification. At a 20× magnification, approximately 16,300 individual image tiles must be captured to digitize a two inch by one inch area of a microscope slide using a 752 by 480 pixel one-half inch format area scan CCD. Assuming further that it takes approximately one second to acquire each image tile, due in large part to the relatively long mechanical settling times associated with each of the 16,300 repeated stop-and-go commands, the total acquisition time would be four and one-half hours. At a 40× magnification, the acquisition time would quadruple to eighteen hours. Even at a 10× magnification the acquisition time would exceed one hour. However, at the BLISS system's very low magnification of 1.25×, only 64 image tiles are needed to create a macro-image of a two inch by one inch area of a microscope slide. The total acquisition time for such a macro-image is about one minute.

Understanding now that the acquisition time limitations of any image tiling system require the capture of a very low magnification macro-image, followed by the interactive selection from this macro image of small areas to be captured at higher magnification, a third disadvantage of the BLISS system becomes apparent. This third disadvantage resides in the realization that locating areas of interest from a very low magnification macro-image is practically limited to samples in which anatomic reference information is available. The BLISS system thus has limited utility for non-histological samples such as Pap smears, because such cytological samples inherently lack any information about anatomic orientation. In such samples the cells are more or less randomly distributed over a large area of the microscope slide. Without the ability to define, using the macro image, the specific smaller regions of interest that are to be tiled at higher optical magnifications, the only alternative is to scan and digitize the entire sample. However, as described previously, the long acquisition times required by the image tiling method make this alternative virtually impractical. Stated differently, without manual intervention to define specific and significantly smaller areas of the microscope slide for image tiling at higher magnifications, an impossibility for cytological samples, a tiling approach has limited utility. One would prefer a system for scanning microscope slides which is fully automatic, without the need for manual intervention. Such a system would also be suitable for all types of microscope slides, regardless of whether or not the slide contains anatomic reference information.

A fourth disadvantage of the BLISS system is its complexity and expense. The BLISS system is based largely on off-the-shelf components, including a high-end, fully automated third-party microscope with multiple objective lenses and an expensive closed x/y stage control loop. The suggested end-user price of the BLISS system is well above $100,000. The multiple automated elements of the BLISS system represent a complicated system that, in spite of its extensive automation, may be difficult to operate and maintain. One would prefer a system for scanning microscope slides which is simple and reliable, and which can be made available for about one third of the cost of the BLISS system.

Inherent in the cost disadvantage of the BLISS system are several limitations of any microscope slide scanning system that is based on a conventional microscope. The most expensive component of the BLISS system is the automated microscope itself. One of the reasons for incorporating a fully automatic microscope into the BLISS system is the need for automatically changing many settings when the microscope objective lens turret is rotated automatically to change microscope objective lenses, for example, from 1.25× to 40×. A typical microscope, upon changing the microscope objective lens, will have a different optimal plane of focus and require new settings for the field and condenser diaphragms to achieve Koehler illumination. Also, a different intensity of illumination will be needed to optimally fill the dynamic range of the CCD. The need for such extensive automation is eliminated if the requirement for changing microscope objective lenses can be eliminated. One would prefer a rapid scanning method that can not only overcome the field of view limitations of traditional optical microscopy but that can also eliminate the need for multiple microscope objective lenses, providing a substantial cost advantage over image tiling systems such as BLISS. The need for a single microscope objective lens is also closely related to eliminating the constraints imposed by the optics of a conventional microscope. One would prefer a system based on an optical design that ensures that microscope slides are scanned and digitized at diffraction-limited resolutions, that is, all possible spatial details available at the resolution of the microscope objective lens are captured by the digital image. Once a diffraction-limited digital image has been captured, degenerate lower resolution and magnification images can be created using standard computational algorithms.

In many microscopy applications it is necessary that the entire sample, or a large portion of a sample, be searched for defects or for the presence or absence of a special object or objects, for example, abnormal cells. Microscopy becomes very labor intensive when large portions of a sample, or even the entire sample, must be manually scanned at low resolutions, typically 10× to 20×, in order to identify specific areas of interest for subsequent higher resolution interrogation. Extended manual screening or continued viewing of a single field causes eyestrain, fatigue, and visual habituation that can negatively affect productivity and accuracy. The problem of rapidly finding and locating relevant areas of interest for subsequent higher resolution interrogation has been addressed using conventional real-time scanning systems that combine microscopes with ancillary linear array detectors and automated positioning tables, all controlled by a computer. Some approaches, such as the system discussed in U.S. Pat. No. 5,922,282 (Ledley et al.), are based on storing the x/y stage coordinates of relevant objects found on regions of the physical slide to enable relocation of the object, in this case mycobacteria on a customized glass microscope slide. The x/y coordinates of the mycobacteria are obtained using specialized real-time pattern recognition circuitry that is applied to the intensity information measured by a line scan camera that is synchronized to a stage which is moved in relatively large five micrometer steps. Alternatively, an area scan sensor such as a video camera can be used as the basis for deriving the x/y coordinates of selected objects, in conjunction with similar circuitry. In this latter case, the stage is moved in larger steps corresponding to a complete image field, similar to the stage movements required by the tiling method. Focus is maintained using instantaneous automated focus control. An alternate system described in U.S. Pat. No. 4,700,298 (Palcic et al.) uses a linear array CCD attached to a commercially available microscope, with means for autofocus, to scan large areas for purposes of recording, in real time, the x/y coordinates of cells growing in a tissue flask. These known methods and systems are all based on the real-time analysis of digital information that is acquired and processed during the scanning process. In many cases, specialized circuitry is used to immediately process the intensity data that has been read out from the linear array detector, enabling a decision to be made in real-time. An alternative novel approach is to use a linear array sensor to rapidly assemble a large contiguous image of the entire microscope slide at optical resolutions sufficient for automating the labor intensive aspects of manual slide scanning. One would prefer a system that can be used, together with digital image processing methods, as an alternative to manual slide scanning.

Another common problem associated with manual scanning of microscope slides is that portions of a slide are easily missed during manual x/y scanning of a slide. Relocation to previously identified cells can be difficult, especially after the slide has been removed from the microscope. The problem of not missing any areas of a slide during manual x/y scanning has been addressed by position encoding quality assurance systems that record the x/y position and dwell time of areas of the physical slide that have been examined manually, thus highlighting areas of the slide that were missed or possibly viewed too quickly. U.S. Pat. No. 5,793,969 (Kamentsky et al.) discusses a method for quality assurance of a Pap smear slide that has been previously reviewed by a technologist. This method is based on recording the x/y stage coordinates of all fields visited by the technologist during the slide review, and creating an x/y map of relative slide dwell times.

A definite need exists for a simple and reliable system that can rapidly scan and digitize an entire microscope slide. The scanning and digitization should be performed at optical resolutions comparable to those used for the manual scanning of microscope slides, thereby enabling the application of image processing algorithms to the digital imagery data set, in lieu of, or in addition to, manually scanning an entire slide. Ideally, such a system should not require any type of manual intervention during the image acquisition process. Such a system should also be suitable for all types of microscope specimens, regardless of whether or not the slide contains anatomic reference information. Ideally, such a system should have a lower cost than conventional systems. Such a system should also not be constrained by the limitations and inherent cost of conventional off-the-shelf microscopes, enabling an optical design that allows the capture of diffraction-limited digital images. A primary purpose of the present invention is to solve these needs and to provide further, related advantages.

SUMMARY

The present invention provides an apparatus for and a method of fully automatic rapid scanning and digitizing of an entire microscope sample, or a substantially large portion of a microscope sample, using a linear array detector synchronized with a positioning stage that is part of a computer controlled microscope slide scanner. The invention also provides a method for composing the image strips obtained from successive scans of the sample into a single contiguous digital image. The invention further provides a method for statically displaying sub-regions of this large digital image at different magnifications, together with a reduced magnification macro image of the entire sample. The invention also provides a method for dynamically displaying, with or without operator interaction, portions of the contiguous digital image. In one preferred embodiment of the invention, all elements of the scanner are part of a single-enclosure that has a primary connection to a network such as the Internet or a local intranet. In this embodiment, the preferred sample type is a microscope slide and the illumination and imaging optics are consistent with transmission mode optics optimized for diffraction-limited digital imaging.

BRIEF DESCRIPTION OF THE DRAWINGS

The above and other objects and advantages of the present invention will be more readily appreciated from the following detailed description when read in conjunction with the accompanying drawing, wherein.

DETAILED DESCRIPTION

Figure 1:
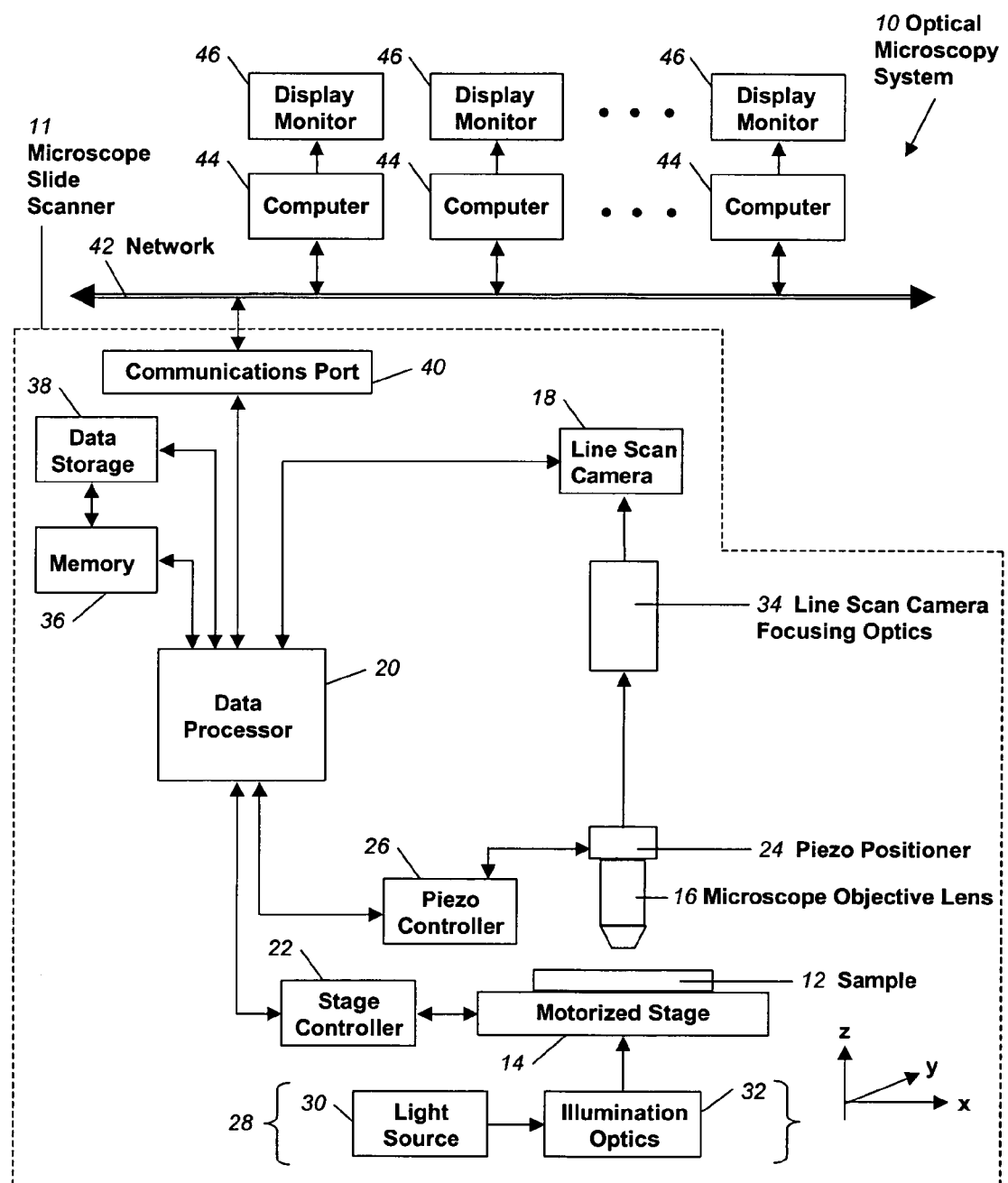
FIG. 1 is a block diagram of a preferred embodiment of an optical microscopy system according to the present invention.

Turning first to FIG. 1, a block diagram of a preferred embodiment of an optical microscopy system 10 according to the present invention is shown. The heart of the system 10 is a microscope slide scanner 11 that serves to scan and digitize a specimen or sample 12. The sample 12 can be anything that may be interrogated by optical microscopy. For instance, the sample 12 may be a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 12 may also be an array of any type of DNA or DNA-related material such as cDNA or RNA or protein that is deposited on any type of slide or other substrate, including any and all samples commonly known as a microarrays. The sample 12 may be a microtiter plate, for example a 96-well plate. Other examples of the sample 12 include integrated circuit boards, electrophoresis records, petri dishes, film, semiconductor materials, forensic materials, or machined parts.

The scanner 11 includes a motorized stage 14, a microscope objective lens 16, a line scan camera 18, and a data processor 20. The sample 12 is positioned on the motorized stage 14 for scanning. The motorized stage 14 is connected to a stage controller 22 which is connected in turn to the data processor 20. The data processor 20 determines the position of the sample 12 on the motorized stage 14 via the stage controller 22. In the presently preferred embodiment, the motorized stage 14 moves the sample 12 in at least the two axes (x/y) that are in the plane of the sample 12. Fine movements of the sample 12 along the optical z-axis may also be necessary for certain applications of the scanner 11, for example, for focus control. Z-axis movement is preferably accomplished with a piezo positioner 24, such as the PIFOC from Polytec PI or the MIPOS 3 from Piezosystem Jena. The piezo positioner 24 is attached directly to the microscope objective 16 and is connected to and directed by the data processor 20 via a piezo controller 26. A means of providing a coarse focus adjustment may also be needed and can be provided by z-axis movement as part of the motorized stage 14 or a manual rack-and-pinion coarse focus adjustment (not shown).

In the presently preferred embodiment, the motorized stage 14 includes a high precision positioning table with ball bearing linear ways to provide smooth motion and excellent straight line and flatness accuracy. For example, the motorized stage 14 could include two Daedal model 106004 tables stacked one on top of the other. Other types of motorized stages 14 are also suitable for the scanner 11, including stacked single axis stages based on ways other than ball bearings, single- or multiple-axis positioning stages that are open in the center and are particularly suitable for trans-illumination from below the sample, or larger stages that can support a plurality of samples. In the presently preferred embodiment, motorized stage 14 includes two stacked single-axis positioning tables, each coupled to two millimeter lead-screws and Nema-23 stepping motors. At the maximum lead screw speed of twenty-five revolutions per second, the maximum speed of the sample 12 on the motorized stage 14 is fifty millimeters per second. Selection of a lead screw with larger diameter, for example five millimeters, can increase the maximum speed to more than 100 millimeters per second. The motorized stage 14 can be equipped with mechanical or optical position encoders which has the disadvantage of adding significant expense to the system. Consequently, the presently preferred embodiment does not include position encoders. However, if one were to use servo motors in place of stepping motors, then one would have to use position feedback for proper control.

Position commands from the data processor 20 are converted to motor current or voltage commands in the stage controller 22. In the presently preferred embodiment, the stage controller 22 includes a 2-axis servo/stepper motor controller (Compumotor 6K2) and two 4-amp microstepping drives (Compumotor OEMZL4). Microstepping provides a means for commanding the stepper motor in much smaller increments than the relatively large single 1.8 degree motor step. For example, at a microstep of 100, the sample 12 can be commanded to move at steps as small as 0.1 micrometer. A microstep of 25,000 is used in the presently preferred embodiment of this invention. Smaller step sizes are also possible. It should be obvious that the optimum selection of the motorized stage 14 and the stage controller 22 depends on many factors, including the nature of the sample 12, the desired time for sample digitization, and the desired resolution of the resulting digital image of the sample 12.

The microscope objective lens 16 can be any microscope objective lens commonly available. One of ordinary skill in the art will realize that the choice of which objective lens to use will depend on the particular circumstances. In the preferred embodiment of the present invention, the microscope objective lens 16 is of the infinity-corrected type.

The sample 12 is illuminated by an illumination system 28 that includes a light source 30 and illumination optics 32. The light source 30 in the presently preferred embodiment includes a variable intensity halogen light source with a concave reflective mirror to maximize light output and a KG-1 filter to suppress heat. However, the light source 30 could also be any other type of arc-lamp, laser, or other source of light. The illumination optics 32 in the presently preferred embodiment include a standard Köhler illumination system with two conjugate planes that are orthogonal to the optical axis. The illumination optics 32 are representative of the bright-field illumination optics that can be found on most commercially available compound microscopes sold by companies such as Carl Zeiss, Nikon, Olympus, or Leica. One set of conjugate planes includes (i) a field iris aperture illuminated by the light source 30, (ii) the object plane that is defined by the focal plane of the sample 12, and (iii) the plane containing the light-responsive elements of the line scan camera 18. A second conjugate plane includes (i) the filament of the bulb that is part of the light source 30, (ii) the aperture of a condenser iris that sits immediately before the condenser optics that are part of the illumination optics 32, and (iii) the back focal plane of the microscope objective lens 16. In the presently preferred embodiment, the sample 12 is illuminated and imaged in transmission mode, with the line scan camera 18 sensing optical energy that is transmitted by the sample 12, or conversely, optical energy that is absorbed by the sample 12.

The scanner 11 of the present invention is equally suitable for detecting optical energy that is reflected from the sample 12, in which case the light source 30, the illumination optics 32, and the microscope objective lens 16 must be selected based on compatibility with reflection imaging. One possible embodiment may therefore be illumination through a fiber optic bundle that is positioned above the sample 12. Other possibilities include excitation that is spectrally conditioned by a monochromator. If the microscope objective lens 16 is selected to be compatible with phase-contrast microscopy, then the incorporation of at least one phase stop in the condenser optics that are part of the illumination optics 32 will enable the scanner 11 to be used for phase contrast microscopy. To one of ordinary skill in the art, the modifications required for other types of microscopy such as differential interference contrast and confocal microscopy should be readily apparent. Overall, the scanner 11 is suitable, with appropriate but well-known modifications, for the interrogation of microscopic samples in any known mode of optical microscopy.

Between the microscope objective lens 16 and the line scan camera 18 are situated the line scan camera focusing optics 34 that focus the optical signal captured by the microscope objective lens 16 onto the light-responsive elements of the line scan camera 18. In a modern infinity-corrected microscope the focusing optics between the microscope objective lens and the eyepiece optics, or between the microscope objective lens and an external imaging port, consist of an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from the sample 12 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

The line scan camera focusing optics 34 include a tube lens optic mounted inside of a mechanical tube. Since the scanner 11, in its preferred embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since the scanner 11 also overcomes the field of view limitation of a traditional microscope by providing a field of view that is practically limited only by the physical boundaries of the sample 12, the importance of magnification in an all-digital imaging microscope such as provided by the present scanner 11 is limited. Once a portion of the sample 12 has been digitized, it is straightforward to apply electronic magnification, sometimes known as electric zoom, to an image of the sample 12 in order to increase its magnification. Increasing the magnification of an image electronically has the effect of increasing the size of that image on the monitor that is used to display the image. If too much electronic zoom is applied, then the display monitor will be able to show only portions of the magnified image. It is not possible, however, to use electronic magnification to display information that was not present in the original optical signal that was digitized in the first place. Since one of the objectives of the scanner 11 is to provide high quality digital images, in lieu of visual observation through the eyepieces of a microscope, it is important that the content of the images acquired by the scanner 11 include as much image detail as possible. The term resolution is typically used to describe such image detail and the term diffraction-limited is used to describe the wavelength-limited maximum spatial detail available in an optical signal. The scanner 11 provides diffraction-limited digital imaging by selection of a tube lens focal length that is matched according to the well know Nyquist sampling criteria to both the size of an individual pixel element in a light-sensing camera such as the line scan camera 18 and to the numerical aperture of the microscope objective lens 16. It is well known that numerical aperture, not magnification, is the resolution-limiting attribute of a microscope objective lens 16.

An example will help to illustrate the optimum selection of a tube lens focal length that is part of the line scan camera focusing optics 34. Consider again the 20× microscope objective lens 16 with 9 millimeter focal length discussed previously and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that the line scan camera 18, which in its preferred embodiment has a plurality of 14 micrometer square pixels, is used to detect a portion of the sample 12. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. The line scan focusing optics 34 with a tube lens optic having a focal length of 420 millimeters will therefore be capable of acquiring images with the best possible spatial resolution, similar to what would be observed by viewing a specimen under a microscope using the same 20× objective lens. To reiterate, the scanner 11 utilizes a traditional 20× microscope objective lens 16 in a higher magnification optical configuration, in this example about 47×, in order to acquire diffraction-limited digital images. If a traditional 20× magnification objective lens 16 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. The line scan camera focusing optics 34 are modular elements of the scanner 11 and can be interchanged as necessary for optimum digital imaging. The advantage of diffraction-limited digital imaging is particularly significant for applications, for example bright field microscopy, in which the reduction in signal brightness that accompanies increases in magnification is readily compensated by increasing the intensity of an appropriately designed illumination system 28.

In principle, it is possible to attach external magnification-increasing optics to a conventional microscope-based digital imaging system to effectively increase the tube lens magnification so as to achieve diffraction-limited imaging as has just been described for the present scanner 11; however, the resulting decrease in the field of view is often unacceptable, making this approach impractical. Furthermore, many users of microscopes typically do not understand enough about the details of diffraction-limited imaging to effectively employ these techniques on their own. In practice, digital cameras are attached to microscope ports with magnification-decreasing optical couplers to attempt to increase the size of the field of view to something more similar to what can be seen through the eyepiece. The standard practice of adding de-magnifying optics is a step in the wrong direction if the goal is to obtain diffraction-limited digital images.

In a conventional microscope, different power objectives lenses are typically used to view the specimen at different resolutions and magnifications. Standard microscopes have a nosepiece that holds five objectives lenses. In an all-digital imaging system such as the present scanner 11 there is a need for only one microscope objective lens 16 with a numerical aperture corresponding to the highest spatial resolution desirable. The presently preferred embodiment of the scanner 11 provides for only one microscope objective lens 16. Once a diffraction-limited digital image has been captured at this resolution, it is straightforward using standard digital image processing techniques, to present imagery information at any desirable reduced resolutions and magnifications.

The presently preferred embodiment of the scanner 11 is based on a Dalsa SPARK line scan camera 18 with 1024 pixels (picture elements) arranged in a linear array, with each pixel having a dimension of 14 by 14 micrometers. Any other type of linear array, whether packaged as part of a camera or custom-integrated into an imaging electronic module, can also be used. The linear array in the presently preferred embodiment effectively provides eight bits of quantization, but other arrays providing higher or lower level of quantization may also be used. Alternate arrays based on 3-channel red-green-blue (RGB) color information or time delay integration (TDI), may also be used. TDI arrays provide a substantially better signal-to-noise ratio (SNR) in the output signal by summing intensity data from previously imaged regions of a specimen, yielding an increase in the SNR that is in proportion to the square-root of the number of integration stages. TDI arrays can comprise multiple stages of linear arrays. TDI arrays are available with 24, 32, 48, 64, 96, or even more stages. The scanner 11 also supports linear arrays that are manufactured in a variety of formats including some with 512 pixels, some with 1024 pixels, and others having as many as 4096 pixels. Appropriate, but well known, modifications to the illumination system 28 and the line scan camera focusing optics 34 may be required to accommodate larger arrays. Linear arrays with a variety of pixel sizes can also be used in scanner 11. The salient requirement for the selection of any type of line scan camera 18 is that the sample 12 can be in motion with respect to the line scan camera 18 during the digitization of the sample 12 in order to obtain high quality images, overcoming the static requirements of the conventional imaging tiling approaches known in the prior art.

The output signal of the line scan camera 18 is connected to the data processor 20. The data processor 20 in the presently preferred embodiment includes a central processing unit with ancillary electronics, for example a motherboard, to support at least one signal digitizing electronics board such as an imaging board or a frame grabber. In the presently preferred embodiment, the imaging board is an EPIX PIXCID24 PCI bus imaging board, however, there are many other types of imaging boards or frame grabbers from a variety of manufacturers which could be used in place of the EPIX board. An alternate embodiment could be a line scan camera that uses an interface such as IEEE 1394, also known as Firewire, to bypass the imaging board altogether and store data directly on a data storage 38, such as a hard disk.

The data processor 20 is also connected to a memory 36, such as random access memory (RAM), for the short-term storage of data, and to the data storage 38, such as a hard drive, for long-term data storage. Further, the data processor 20 is connected to a communications port 40 that is connected to a network 42 such as a local area network (LAN), a wide area network (WAN), a metropolitan area network (MAN), an intranet, an extranet, or the global Internet. The memory 36 and the data storage 38 are also connected to each other. The data processor 20 is also capable of executing computer programs, in the form of software, to control critical elements of the scanner 11 such as the line scan camera 18 and the stage controller 22, or for a variety of image-processing functions, image-analysis functions, or networking. The data processor 20 can be based on any operating system, including operating systems such as Windows, Linux, OS/2, Mac OS, and Unix. In the presently preferred embodiment, the data processor 20 operates based on the Windows NT operating system.

The data processor 20, memory 36, data storage 38, and communication port 40 are each elements that can be found in a conventional computer. One example would be a personal computer such as a Dell Dimension XPS T500 that features a Pentium III 500 MHz processor and up to 756 megabytes (MB) of RAM. In the presently preferred embodiment, the computer, elements which include the data processor 20, memory 36, data storage 38, and communications port 40 are all internal to the scanner 11, so that the only connection of the scanner 11 to the other elements of the system 10 is the communication port 40. In an alternate embodiment of the scanner 11, the computer elements would be external to the scanner 11 with a corresponding connection between the computer elements and the scanner 11.

The scanner 11, in the presently preferred embodiment of the invention, integrates optical microscopy, digital imaging, motorized sample positioning, computing, and network-based communications into a single-enclosure unit. The major advantage of packaging the scanner 11 as a single-enclosure unit with the communications port 40 as the primary means of data input and output are reduced complexity and increased reliability. The various elements of the scanner 11 are optimized to work together, in sharp contrast to traditional microscope-based imaging systems in which the microscope, light source, motorized stage, camera, and computer are typically provided by different vendors and require substantial integration and maintenance.

The communication port 40 provides a means for rapid communications with the other elements of the system 10, including the network 42. The presently preferred communications protocol for the communications port 40 is a carriersense multiple-access collision detection protocol such as Ethernet, together with the TCP/IP protocol for transmission control and internetworking. The scanner 11 is intended to work with any type of transmission media, including broadband, baseband, coaxial cable, twisted pair, fiber optics, DSL or wireless.

In the presently preferred embodiment, control of the scanner 11 and review of the imagery data captured by the scanner 11 are performed on a computer 44 that is connected to the network 42. The computer 44, in its presently preferred embodiment, is connected to a display monitor 46 to provide imagery information to an operator. A plurality of computers 44 may be connected to the network 42. In the presently preferred embodiment, the computer 44 communicates with the scanner 11 using a network browser such as Internet Explorer from Microsoft or Netscape Communicator from AOL. Images are stored on the scanner 11 in a common compressed format such a JPEG which is an image format that is compatible with standard image-decompression methods that are already built into most commercial browsers. Other standard or non-standard, lossy or lossless, image compression formats will also work. In the presently preferred embodiment, the scanner 11 is a webserver providing an operator interface that is based on webpages that are sent from the scanner 11 to the computer 44. For dynamic review of imagery data, the currently preferred embodiment of the scanner 11 is based on playing back, for review on the display monitor 46 that is connected to the computer 44, multiple frames of imagery data using standard multiple-frame browser compatible software packages such as Media-Player from Microsoft, Quicktime from Apple Computer, or Real-Player from Real Networks. In the presently preferred embodiment, the browser on the computer 44 uses the hypertext transmission protocol (http) together with TCP for transmission control.

There are, and will be in the future, many different means and protocols by which the scanner 11 could communicate with the computer 44, or a plurality of computers. While the presently preferred embodiment is based on standard means and protocols, the approach of developing one or multiple customized software modules known as applets is equally feasible and may be desirable for selected future applications of the scanner 11. Further, there are no constraints that computer 44 be of any specific type such as a personal computer (PC) or be manufactured by any specific company such as Dell. One of the advantages of a standardized communications port 40 is that any type of computer 44 operating common network browser software can communicate with the scanner 11.

If one so desires, it is possible, with some modifications to the scanner 11, to obtain spectrally resolved images. Spectrally resolved images are images in which spectral information is measured at every image pixel. Spectrally resolved images could be obtained by replacing the line scan camera 18 of the scanner 11 with an optical slit and an imaging spectrograph. The imaging spectrograph uses a two-dimensional CCD detector to capture wavelength-specific intensity data for a column of image pixels by using a prism or grating to disperse the optical signal that is focused on the optical slit along each of the rows of the detector.

Figure 2:
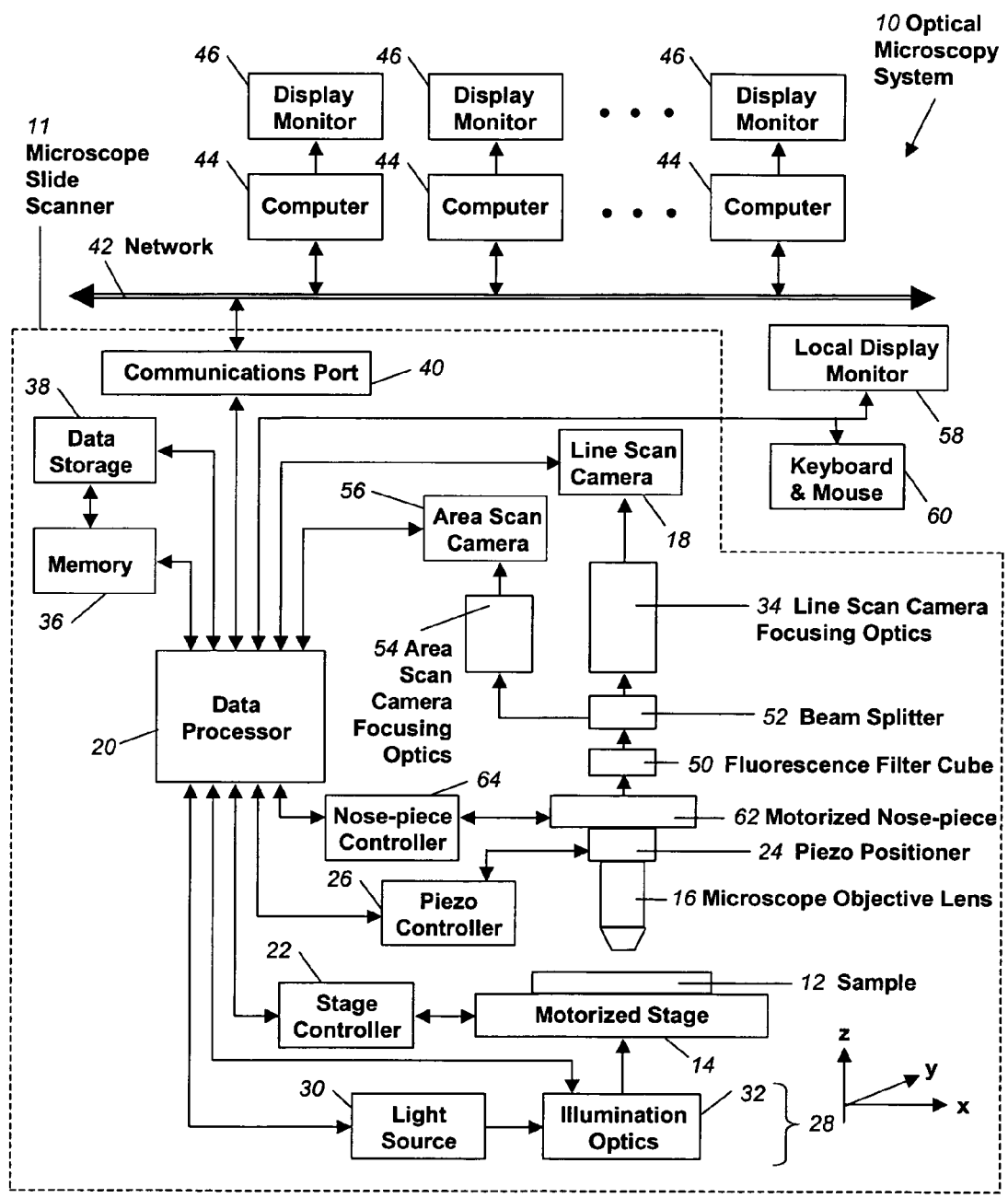
FIG. 2 is a block diagram of a second embodiment of an optical microscopy system according to the present invention.

Turning now to FIG. 2, a block diagram of a second embodiment of an optical microscopy system 10 according to the present invention is shown. In this system 10, the scanner 11 is more complex and expensive than the currently preferred embodiment shown in FIG. 1. The additional attributes of the scanner 11 that are shown do not all have to be present for any alternate embodiment to function correctly. FIG. 2 is intended to provide a reasonable example of additional features and capabilities that could be incorporated into the scanner 11.

The alternate embodiment of FIG. 2 provides for a much greater level of automation than the presently preferred embodiment of FIG. 1. A more complete level of automation of the illumination system 28 is achieved by connections between the data processor 20 and both the light source 30 and the illumination optics 32 of the illumination system 28. The connection to the light source 30 may control the voltage, or current, in an open or closed loop fashion, in order to control the intensity of the light source 30. Recall that the light source 30 is a halogen bulb in the presently preferred embodiment. The connection between the data processor 20 and the illumination optics 32 could provide closed loop control of the field iris aperture and the condenser iris to provide a means for ensuring that optimum Köhler illumination is maintained.

Use of the scanner 11 for fluorescence imaging requires easily recognized modifications to the light source 30, the illumination optics 32, and the microscope objective lens 16. The second embodiment of FIG. 2 also provides for a fluorescence filter cube 50 that includes an excitation filter, a dichroic filter, and a barrier filter. The fluorescence filter cube 50 is positioned in the infinity corrected beam path that exists between the microscope objective lens 16 and line scan camera focusing optics 34. One embodiment for fluorescence imaging could include the addition of a filter wheel or tunable filter into the illumination optics 32 to provide appropriate spectral excitation for the variety of fluorescent dyes or nanocrystals available on the market.

The addition of at least one beam splitter 52 into the imaging path allows the optical signal to be split into at least two paths. The primary path is via the line scan camera focusing optics 34, as discussed previously, to enable diffraction-limited imaging by the line scan camera 18. A second path is provided via an area scan camera focusing optics 54 for imaging by an area scan camera 56. It should be readily apparent that proper selection of these two focusing optics can ensure diffraction-limited imaging by the two camera sensors having different pixel sizes. The area scan camera 56 can be one of many types that are currently available, including a simple color video camera, a high performance, cooled, CCD camera, or a variable integration-time fast frame camera. The area scan camera 56 provides a traditional imaging system configuration for the scanner 11. The area scan camera 56 is connected to the data processor 20. If two cameras are used, for example the line scan camera 18 and the area scan camera 56, both camera types could be connected to the data processor using either a single dual-purpose imaging board, two different imaging boards, or the IEEE1394 Firewire interface, in which case one or both imaging boards may not be needed. Other related methods of interfacing imaging sensors to the data processor 20 are also available.

While the primary interface of the scanner 11 to the computer 44 is via the network 42, there may be instances, for example a failure of the network 42, where it is beneficial to be able to connect the scanner 11 directly to a local output device such as a display monitor 58 and to also provide local input devices such as a keyboard and mouse 60 that are connected directly into the data processor 20 of the scanner 11. In this instance, the appropriate driver software and hardware would have to be provided as well.

The second embodiment shown in FIG. 2 also provides for a much greater level of automated imaging performance. Enhanced automation of the imaging of the scanner 11 can be achieved by closing the focus control loop comprising the piezo positioner 24, the piezo controller 26, and the data processor 20 using well-known methods of autofocus. The second embodiment also provides for a motorized nose-piece 62 to accommodate several objectives lenses. The motorized nose-piece 62 is connected to and directed by the data processor 20 through a nose-piece controller 64.

There are other features and capabilities of the scanner 11 which could be incorporated. For example, the process of scanning the sample 12 with respect to the microscope objective lens 16 that is substantially stationary in the x/y plane of the sample 12 could be modified to comprise scanning of the microscope objective lens 16 with respect to a stationary sample 12. Scanning the sample 12, or scanning the microscope objective lens 16, or scanning both the sample 12 and the microscope objective lens 16 simultaneously, are possible embodiments of the scanner 11 which can provide the same large contiguous digital image of the sample 12 as discussed previously.

The scanner 11 also provides a general purpose platform for automating many types of microscope-based analyses. The illumination system 28 could be modified from a traditional halogen lamp or arc-lamp to a laser-based illumination system to permit scanning of the sample 12 with laser excitation. Modifications, including the incorporation of a photomultiplier tube or other non-imaging detector, in addition to or in lieu of the line scan camera 18 or the area scan camera 56, could be used to provide a means of detecting the optical signal resulting from the interaction of the laser energy with the sample 12.

Figure 3A:
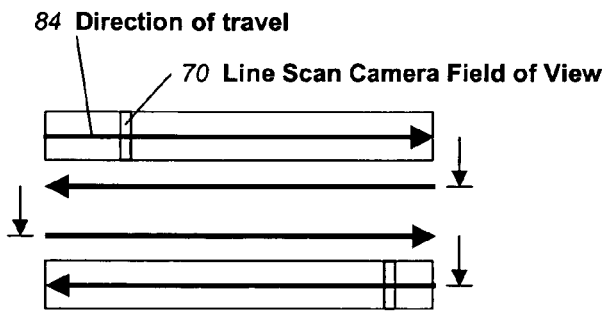
FIGS. 3A-3C illustrates a manner in which contiguous image strips acquired by a linear array detector digitizes a portion of a sample according to the present invention.
Figure 3B:
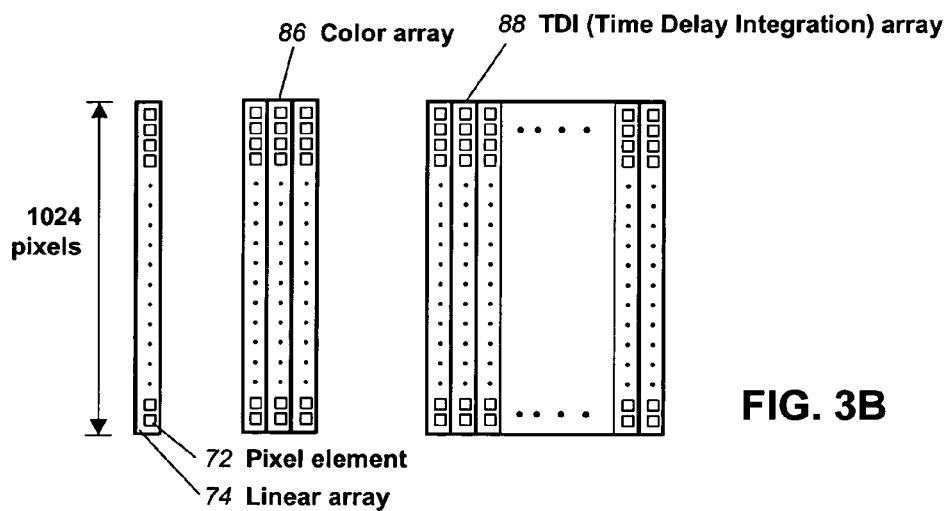
Figure 3C:
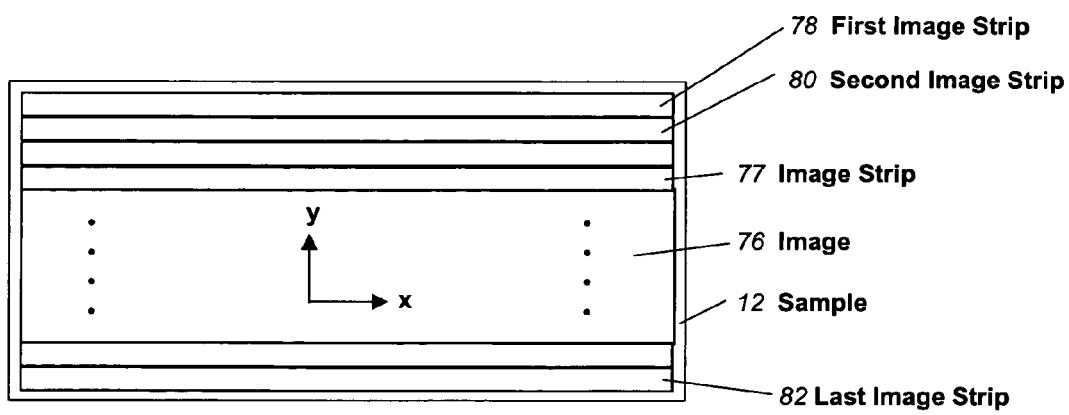

Turning now to FIGS. 3A-3C, the manner in which contiguous image strips are acquired by a linear array detector according to the present invention is shown. The line scan camera 18 of FIG. 1 observes a line scan camera field of view 70 as shown in FIG. 3A. The line scan camera field of view 70 comprises the region of the sample 12 of FIG. 1 that is imaged by a multitude of individual pixel elements 72 that are arranged in a linear fashion into a linear array 74 as shown in FIG. 3B. The linear array 74 of the presently preferred embodiment comprises 1024 of the individual pixel elements 72, with each of the pixel elements 72 being 14 micrometers square. The physical dimensions of the linear array 74 of the presently preferred embodiment are 14.34 millimeters by 14 micrometers. Assuming, for purposes of discussion of the operation of the scanner 11, that the magnification between the sample 12 and the line scan camera 18 is ten, then the line scan camera field of view 70 corresponds to a region of the sample 12 that has dimensions equal to 1.43 millimeters by 1.4 micrometers. Each pixel element 72 images an area about 1.4 micrometers by 1.4 micrometers.

FIG. 3C illustrates that during digital scanning of the sample 12, an image 76 is acquired in image strips, such as image strip 77, starting with a first image strip 78, followed by a second image strip 80, and so on, until the last image strip 82 necessary to digitize the image 76 has been acquired. One of ordinary skill in the art will realize that the scanning may be either top-to-bottom or bottom-to-top or may start any point on the sample. The digital scanning may also involve vertical image strips rather than horizontal image strips. While desirable, it is also not necessary that the image strips be acquired in a contiguous manner. The image 76 can comprise the entire sample 12 or only a portion of the sample 12. In the presently preferred embodiment of the scanner 11, the scanning and digitization is performed in a direction of travel 84 that alternates between image strips, as shown in FIG. 3A. This type of bi-directional scanning provides for a more rapid digitization process than uni-directional scanning, a method of scanning and digitization which requires the same direction of travel 84 for each image strip.

The capabilities of the line scan camera 18 typically determine whether scanning can be done bi-directionally, as in the currently preferred embodiment of the scanner 11, or uni-directionally. Uni-directional systems often comprise more than one linear array 74, such as a three channel color array 86 or a multi-channel TDI array 88 shown in FIG. 3B. The color array 86 detects the RGB intensities required for obtaining a color image. An alternate embodiment for obtaining color information uses a prism to split the broadband optical signal into the three color channels. The TDI array 88 could be used in an alternate embodiment of the scanner 11 to provide a means of increasing the effective integration time of the line scan camera 18, while maintaining a fast data rate, and without significant loss in the signal-to-noise ratio of the digital imagery data.

Figure 4:
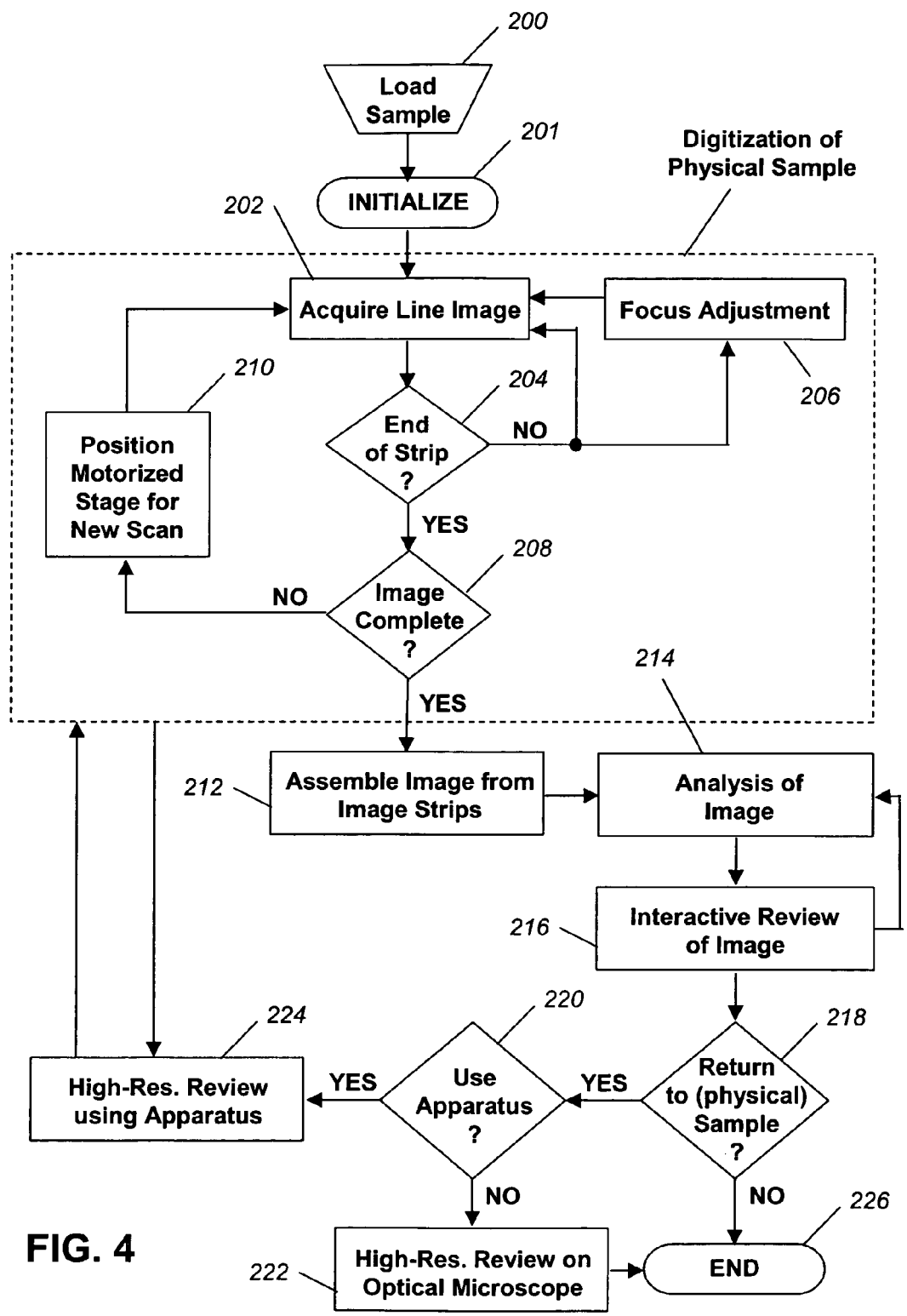
FIG. 4 is a simplified flow chart of the operation of an optical microscopy system according to the present invention.

Turning now to FIG. 4, a simplified flow chart of the operation of an optical microscopy system 10 according to the present invention is shown. The sample 12 is loaded into scanner 11 at step 200. The simplest method of sample loading is for an operator to physically place or position the sample 12 on the motorized stage 14. The most advanced method of sample loading is for the scanner 11 to automatically load one or multiple samples 12 from a sample cassette that has been previously loaded. Other embodiments for sample loading are known in the art. In the presently preferred embodiment of this invention, sample loading is performed manually to reduce system cost and mechanical complexity.

The scanner 11 is initialized at step 201 by commands issued from the computer 44, or similarly from buttons that may be part of an alternate embodiment of the scanner 11. Initialization parameters, including the desired resolution of the digitization process, the portion of the sample 12 to be digitized to create the image 76, and the name of a relevant calibration file are entered by an operator at step 201. The scanner 11 defaults to digitizing the entire sample unless instructed otherwise. It is important to note that after loading the sample and initializing the scanner, there should be no need for the manual intervention of the operator in the image acquisition process that follows.

The automatic scanning and digitization of the sample 12 into the image 76 includes steps 202 through 210. These steps are orchestrated by the data processor 20 which synchronizes the read-out of imagery data from the line scan camera 18 one line or image strip at a time, while the sample 12 is moved at substantially constant velocity on the motorized stage 14 that is under control of the stage controller 22. The scanner 11 commences the automatic digitization of the sample 12 at step 202 with the movement of the sample 12 and the acquisition of a single line image from the line scan camera 18, starting in a predetermined region of the sample 12, for example the upper left-hand corner of the sample 12 as shown in FIG. 3C. In step 202, the motorized stage 14 is moved with respect to the line scan camera 18 in the bi-directional back and forth manner discussed previously. The control logic of the decision block of step 204 determines whether the end of an image strip, such as the image strip 77, has been reached. There are many possible ways to implement this logic, some without position feedback from a position encoder. For example, the total number of image lines read out by the line scan camera 18 could be used as a means of knowing when the end of the image strip has been reached. Other parameters such as total elapsed scan time or calibration markings that are part of, or positioned in close proximity to, the sample 18 could also be used. Optical limit switches are provided in the motorized stage 14 of the presently preferred embodiment of the scanner 11 to indicate when it is time to reposition the motorized stage 14 for a new scan. If the end of the image strip 77 has not been reached at step 204, then the digitization process continues with step 202, the acquisition of the next line image. The sample 12 continues to move at approximately constant velocity at all times during the digitization process, and any required focus adjustments are made in parallel with the on-going motion of the mechanical stage 14 as indicated in step 206. Because the focus will not change dramatically from one image strip to the next, focus adjustments are made relatively slowly and gradually. Assuming again, for purposes of discussion of operation of the scanner 11, that the area of the sample 12 to be digitized at a magnification of 10× is 50 millimeters by 25 millimeters, then eighteen image strips, similar to the image strip 77, each of dimension 1.43 millimeters by 50 millimeters must be acquired to generate the image 76. Each image strip 77 would comprise about 36,000 by 1024 pixel elements, with the entire image 76 comprising approximately 36,000 by 18,000 pixels. Unless and until the process of digitizing the desired portion of the sample 12 to create the image 76 has finished, as determined by the decision logic of step 208, the positioning of the sample 12 for a new scan occurs at step 210. Step 210 includes movement of the motorized stage 14 from one image strip to another in order to position the motorized stage 14 for a new scan.

The total time required to acquire the image 76 is proportional to the line rate at which the line scan camera 18 can digitize information. In the presently preferred embodiment of the scanner 11, the line rate is 27,600 lines per second, or 28.3 million pixels per second, for the DALSA SPARK model SP12-01K30 that is used. At a line rate of 27,600 pixels per second, each image strip 77 comprising, for purposes of discussion, 36,000 by 1024 pixels can be digitized in about 1.3 seconds (36,000/27,600). The motorized stage 14 in the present embodiment thus moves at approximately 38 millimeters per second along the x-axis, covering the entire length of the 50 millimeters image strip 77 during these 1.3 seconds. Since the image 76 comprises 18 image strips 77, 23.4 seconds are required to digitize the desired portion of the sample 12. As discussed previously, this time is only valid for a bi-directional line scan camera, such as used in the preferred embodiment of the present invention, that can scan from right to left and also from left to right along the x-axis. An alternated embodiment could utilize a uni-directional type of the line scan camera which can scan only from left to right. In this case, the motorized stage 14 is returned at maximum stage velocity to the same left reference position along the x-axis and all image strips, such as the image strip 77, are acquired in a uni-directional manner going only from left to right. After completing the digitization of an individual image strip, such as the image strip 77, the motorized stage 14 decelerates, comes to a stop, moves downward along the y-axis and accelerates again to scan the subsequent image strip. Allowances, in both time and distance, have to be made for the motorized stage 14 to accelerate and decelerate at the beginning and end of each image strip that is scanned so as to ensure that the motorized stage 14 is moving at substantially constant velocity during the scanning and digitization process. The additional time required for acceleration and deceleration depends on the x-axis performance of the motorized stage 14 and the x-axis attributes of the stage controller 22. In the presently preferred embodiment, the acceleration and deceleration times, using S-curve profiles for smooth motion and minimum jerk, are approximately 0.7 seconds. The consideration of acceleration and deceleration of the motorized stage 14 require that during the new scan set-up comprising step 210, the line scan camera 18 moves off the edges of the portion of the sample 12 that is to be digitized. The new scan set-up time depends on the particular y-axis performance of the motorized stage 14, and the y-axis attributes of the stage controller 22, and is approximately one-half second in the presently preferred embodiment of the invention. Thus, a total of 25.2 seconds, obtained by multiplying 18 image strips times 1.4 seconds, are added for acceleration and deceleration along the x-axis at the beginning and end of each image strip, and an additional nine seconds are added to reposition the motorized along the y-axis for the next scan. The total time required for all portions of the process required to capture the image 76 in the present example is therefore about one minute for a bi-directional scanning embodiment.

The scanner 11 can be further optimized to minimize the total acquisition time of the image 76 even more. The image acquisition time that can be achieved by the scanner 11 depends in part on the line rate of the line scan camera 18. At the line rate of 27,600 lines per second of the present example, each line image is captured in about 0.04 milliseconds. Illumination from the light source that includes a 50 watt bulb, provides sufficient light to register a signal with sufficient signal-to-noise ratio on the line scan camera. At faster readout rates, the exposure time per line is reduced and improvements and enhancements to the illumination system 28 of the scanner 11 may be required. Similarly, for applications of the scanner 11 in which less light is available, for example fluorescence, the effective line integration time must be increased. A TDI type of line scan camera provides an excellent means of increasing the effective integration time while maintaining a fast data read-out, without significant loss in the signal-to-noise ratio of the imagery data.

Faster line scan cameras are commercially available and can be synchronized with faster motorized stages. Alternatively, selection of a linear array, such as linear array 74, but with more than 1024 pixel elements 72 would reduce the number of image strips that have to be scanned to capture image 76, and require fewer acceleration and deceleration cycles. Arrays comprising 2048 or more pixels often have proportionately smaller line rates than arrays with 1024 pixels. The reduced line rate of such larger arrays has the dual benefit of reducing the maximum velocity required by the motorized stage 14, while increasing the line integration time, all without a reduction in total image capture time. The disadvantage of larger format linear arrays is that larger and more expensive optics and illumination systems are required to provide a high quality optical signal without vignetting and other optical aberrations. It is even possible to use multiple sensors to reduce the overall image acquisition time further.

The scanner 11, in its presently preferred embodiment, performs the digitization of the sample using microscope objective lenses having a relatively large depth of field so as to eliminate or minimize the cost and complexity of dynamic autofocus. The theoretical depth of field of an objective lens with numerical aperture (NA) of 0.15 is greater than twenty micrometers. The depth of field degrades to about five micrometers at NA equal to 0.3 and to about 1.8 micrometers at NA equal to 0.5. Depending on the application, the entire sample or portions of the sample 12 may be scanned without any need to adjust the focal plane, even when using objective lenses with moderate numerical apertures. Selection of relatively low NA objective lenses is consistent with one application of the scanner 11 in which it is used as an aid to extensive manual scanning of the sample 12. Such conventional manual scanning is typically performed at low numerical apertures and low magnifications. The image 76 of the sample 12 can thus be used cost-effectively as the basis for a subsequently higher resolution interrogation of selected areas of the sample 12. Based on the decision logic that comprises step 220, either a conventional optical microscope as indicated in step 222 or a higher resolution embodiment of the scanner 11 as shown in step 224 can be used for the higher resolution review of the sample 12. In the latter case, dynamic autofocus may be necessary. The high-resolution digitization of an entire sample 12, such as a microscope slide, or large portions of the sample 12, may not be practical or cost-effective using currently available computing power. However, future cost reductions of, and improvements in, data processing, memory, and data storage are expected to make high-resolution rapid digitization a reality.

The need for focusing during scanning is indicated in step 206 and is very much dependent on the particular application of the scanner 11. The scanner 11 uses a calibration method in which a standardized calibration sample of predetermined shape and size is digitized and the best focus is determined as a function of the x/y position of the motorized stage 14 using methods that are well known in the art. During the scanning and digitization process, the position of the microscope objective lens 16 is moved in accordance with this x/y focus map. Many different approaches to autofocus are known in the art that could be used to change the relative position of the microscope objective lens 16 with respect to the sample 12. A vertical (z) axis component of the motorized stage 14 can be used for autofocus, although the presently preferred method of the invention is to move the microscope objective lens 16 instead using the commercially available piezo positioner 24. While the total range of the piezo positioner 24 that is attached to the microscope objective lens 16 is relatively small, typically 100 micrometers, the bandwidth of a piezo is higher than that of a heavy motorized stage. The higher piezo bandwidth, typically 150 Hertz, is more desirable than a stiffer mechanical stage to minimize vibrations associated with small focus changes.

One of the benefits of the scanner 11 is the rapid digitization of a large portion of the sample 12, in order to provide the image 76 that can be processed efficiently and cost effectively when compared to labor intensive manual scanning of the sample 12. Consistent with this, the scanner 11, in its most basic embodiment, does not require the complexity of dynamic autofocus that is found in some conventional imaging systems. Pre-scanning and mapping of the best focus as a function of x/y position provides adequate focus for most applications. An alternate but more expensive embodiment of the scanner 11 provides extensive autofocus capabilities using an ancillary area scan camera such as the area scan camera 56. More advanced calibration methods in which the spatial information for autofocusing is part of the sample 12, for example, a glass microscope slide with calibration markings, are also possible.

The overall quality of the image 76 is related to the ability of the sample 12 to be moved at substantially constant velocity. Sampling errors leading to image distortion can occur if the synchrony between the line scan camera 18 and the motorized stage 14 are not adequately preserved. Depending on the application and the need for image resolution, the scanner 11 supports different approaches for capturing data in synchrony with sample movement. Pre-scanning of a calibration target of known shape, for example a Ronchi ruling on a microscope slide, is one means by which the scanner 11 achieves constant sample velocities. Capabilities are provided in the data processor 20 to control both the time profile of position commands that are sent to the motorized stage 14 and to dynamically change the line data read-out rate of the line scan camera 18. Since the majority of velocity related errors in the motorized stage 14 are reproducible, the optimization of the position profile or the optimization of the line scan camera 18 readout-rate, so as to obtain optimum images during the calibration scan is sufficient to provide excellent images when the sample 12 is subsequently scanned and digitized. An alternate embodiment of the scanner 11 that is more suitable for digitizing high-resolution images utilizes position feedback from the motorized stage 14. The presently preferred embodiment of the scanner 11 is able to generate high quality images at low to moderate resolutions using calibration methods applied to a calibration target, without the need for feedback from expensive position encoders.

Assuming that the 36,000 by 18,000 pixel image discussed previously as an example is captured at eight bits (one byte) of quantization per pixel, 648 million bytes (megabytes or MB) of RAM are required to store all of the data for all of the image strips 77 in their uncompressed raw format in the memory 36. A plurality of image strips 77 are assembled into the image 76 during step 212. There are many possible ways to assemble the image from the multiple image strips 77 acquired during the digitization of the sample 12. The image assembly method of the currently preferred embodiment of the invention is to scan the sample 12 so as to slightly overlap the image strips 77, for example by 10-20 pixels, and to use these overlapping pixels to fine-tune the x/y alignment of the image strips 77 into a contiguous image 76. Using JPEG or other image compression methods, the data size of the image 76, or the size of individual image strips 77, can be reduced to five to ten percent, or less, of their original size—in many cases without appreciable loss in the information content required by a particular application. The scanner 11 is also capable of eliminating from the image 76 those empty areas that do not contain any meaningful imagery data, further reducing the data storage requirements of the image 76.

One of the motivations for digitizing the sample 12 into a large contiguous image 76, typically at the low to moderate optical resolutions that are used for manually scanning of the sample 12 under a conventional optical microscope, is to be able to apply specialized computer programs to the resulting imagery data. In step 214, the analysis of the image 76 that represents a digitized portion of the sample 12, comprises a variety of methods such as the application of morphological algorithms to identify and locate specific types of objects in the image 76, for example, normal or abnormal cells. Other examples of analysis methods functions might include counting or measuring algorithms, or comparison or quality assurance algorithms to identify defects in the image 76, or other types of algorithms to differentiate the image 76 from previously measured similar images. It should be clear that once the digitization of the image of the sample 12 has been completed, the analysis methods that comprise step 214 do not require that the sample 12 be physically present or available. The methods of step 214 can be applied automatically, or as part of an iterative process involving an operator who interactively reviews the image 76 as shown in step 216, on the computer monitor 46 that is connected to the scanner 11 via the network 42.

A decision to return for a high resolution interrogation of selected areas of the sample 12, using information obtained from the image 76, for example object coordinates obtained from the analysis of the image 76 in steps 214 and 216, is made as part of step 218. If the decision logic in step 218 does not return the analysis to the sample 12, then the operator's task is complete. If the operator wishes to return to the sample 12 as part of step 218, the decision logic of step 220 determines whether the high-resolution interrogation is conducted on a conventional optical microscope as shown in step 222, or using the scanner 11 as per step 224. It should be realized that coordinate information obtained from a low to moderate resolution analysis of the image 76 is sufficient to guide the higher resolution interrogation of the sample 12 on a conventional microscope. The high-resolution review of the sample 12 using the scanner 11 comprises step 224 and includes the ability to remotely control the scanner 11 using many of the previously described features of the alternate embodiment of FIG. 2. For example, the position of the motorized stage 14, as well as the position of the piezo positioner 24, and the illumination intensity of the light source 30 may be under remote control of the operator during step 224. Real-time imagery, for example from the area scan camera 56 may be the basis for this review rather than digitized information from the sample 12. Alternatively, the operator may select smaller portions of the sample 12 to be digitized at higher resolutions using either the line scan camera 18 or the area scan camera 56. In the former case, the process would return to the steps 202 through 210 comprising the digitization of the sample 12 and then return directly to step 224. Autofocus would be utilized as required based on the size of the portion of the sample 12 to be digitized and the depth of field of the microscope objective lens 16 that is utilized.

Figure 5A:
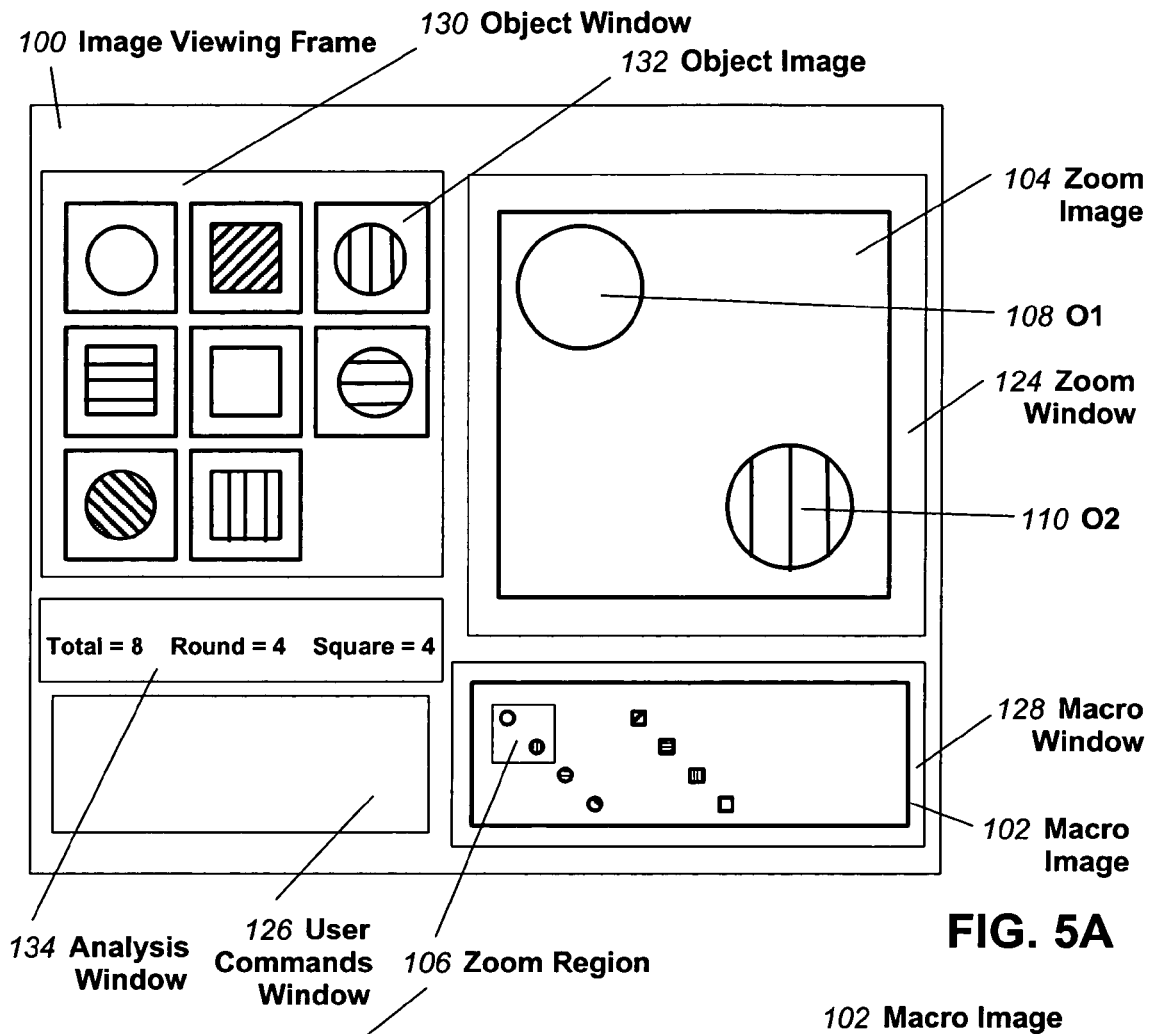
FIGS. 5A-5B are a schematic diagram of an image viewing frame according to the present invention.
Figure 5B:
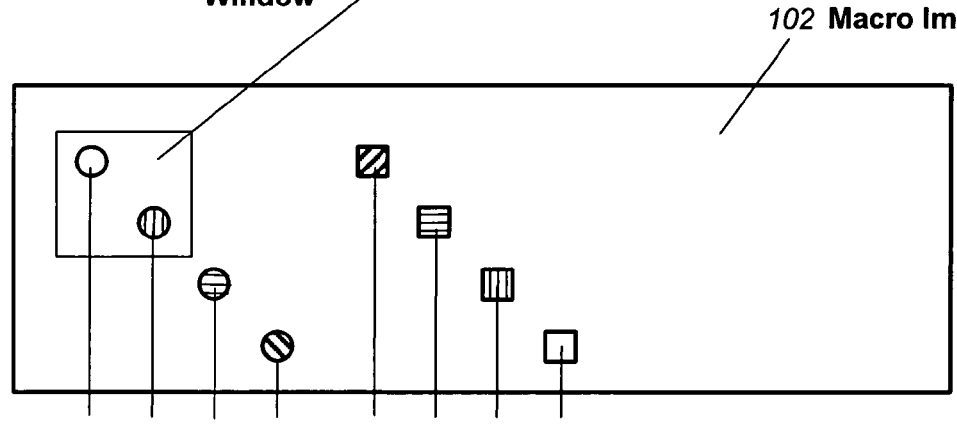

Turning now to FIGS. 5A-5B, a schematic of an image viewing frame 100 according to the present invention is shown which represents one embodiment of a graphical user interface for displaying the image 76 on the display monitor 46 for purposes of interactive reviewing of the image 76 as per step 216. The display of the image 76 that may be on the order of 36,000 by 18,000 pixels or larger, such as the image 76 described in a prior example, is not possible on a conventional monitor or display device such as display monitor 46. The maximum number of pixels on currently available monitors such as a 19-inch Hitachi CM751 monitor is about 1600 by 1200 pixels, with 1024 by 768 pixels being more typical. Only portions of the image 76 can therefore be displayed at any one time at the full resolution of the entire image 76. However, it is possible to display a macro image 102, that is a reduced resolution version of the image 76 on the display monitor 46, together with a higher resolution zoom image 104 that corresponds to a portion of the image 76. The region of the macro image 102 that is displayed in the zoom image 104 is indicated on the macro image 102 itself as a zoom region 106 that can be interactively sized and moved over the entire macro image 102 by the operator. In its simplest embodiment, the zoom region 106 is a fixed rectangular region, but other icons or shapes, including manually drawn regions, could also be implemented. The zoom region 106 provides a critical reference between the macro image 102 and the zoom image 104. An expanded view of the macro image 102 is shown in FIG. 5B, highlighting the presence, for illustrative purposes only, of eight schematic objects in the macro image 102, shown here as four circles and four rectangles and designated as O1 108, O2 110, O3 112, O4 114, O5 116, O6 118, O7 120 and O8 122. Each of the objects in a similar class, in this case similar shape, are distinguished from the other objects in the same class by a unique pattern. The use of very simple objects is intended only to illustrate and clarify the relationship between the different types of information displayed in the image viewing frame 100. In this case, objects O1 108 and O2 112 are within the zoom region 106 and are thus displayed in the zoom image 104 that is part of an operator sizable zoom window 124. The user has the ability, using icons that are part of a user command window 126 that is also part of the image viewing frame 100, to increase the electronic zoom of the zoom image 104. In one embodiment, these icons would be clicked using a mouse as a pointing device, however other means of pointing to an icon or invoking the function associated with an icon are known in the art and can be used here as well. Command icons may be incorporated into any of the windows that are part of the image viewing frame 100, including the user command window 126. For example, an electronic zoom icon can be part of the zoom window 124. As the electronic zoom is increased, the size of the zoom region 106 is decreased on the macro image 102 so as to maintain a constant sized zoom image 104.

General information about any of the images can be displayed as part of the window corresponding to that image. For example, a macro window 128 might display the size of the macro image 102 in pixels, the size of the zoom region 106 in pixels, and the center pixel coordinates of the zoom region 106. The zoom window 124 might display the amount of electronic zoom applied to the zoom image 104 together with a reference to a physical dimension. The size and shape of all windows such as the macro window 128 and the zoom window 124 can be changed interactively by the operator, similar to the way that any windows-based software operates, to accommodate different sample types with different aspect ratios.

The results of step 214, the application of specialized computer programs to the image 76, are displayed in an object window 130 of the image viewing frame 100. The object window 130 in the presently preferred embodiment of this invention comprises a multitude of object images, such as object image 132, that each correspond to different portions of the large contiguous digital image 76. Depending on their size, the object images 132 can be displayed as reduced resolution thumbprint images in an image gallery type arrangement. Clicking or pointing in one of the object images 132 also results in display of that the object image 132 at full resolution as the zoom image 104 that is part of the zoom window 124. The criteria for displaying object images 132 in the object window 130 are based on the specialized computer programs that are applied to the image 76 in step 214. In the present example, the specialized computer program would use simple boundary detection and segmentation algorithms to search the image 76 for the presence of all objects, in this case objects O1 108 through O8 122, and display these objects as object images 132 in the object window 130. A different specialized computer program, for example one that is capable of counting objects and distinguishing circles from squares, could then be applied to each of the object images 132 to provide a further level of classification. The results, in this case numerical results, could be displayed in an analysis window 134 of the image viewing frame 100. The analysis window 134 in the present example could contain the total count of objects, in this case eight, as well as the total count of objects in either of the two classes of shapes, square and round. There are many types of specialized computer programs which could be applied to the image 76, and many types of object images 132 which could be displayed in the object window 130 as a result of applying such specialized computer programs to the image 76. Also, there are many types of more refined specialized computer programs that could be applied to the multitude of object images 132 to provide a higher level of object classification for subsequent display in the analysis window 134 in a variety of formats. The user commands window 126 of the image viewing frame 100 provides a window for interactively selecting the attributes of the image analysis that is performed as part of step 214, and the criteria for the review of the image 76 in step 216.

Figure 6A:
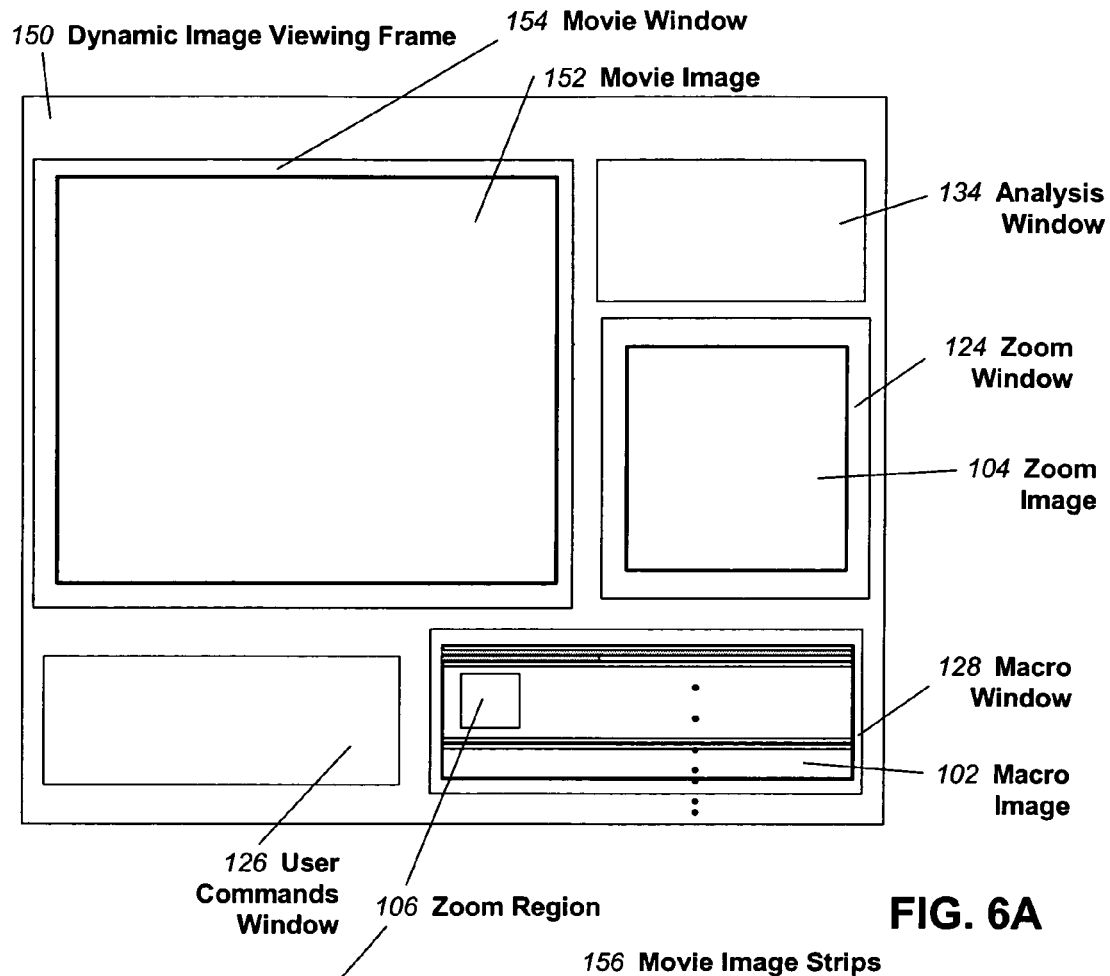
FIGS. 6A-6B are a schematic diagram of a dynamic image viewing frame according to the present invention.
Figure 6B:
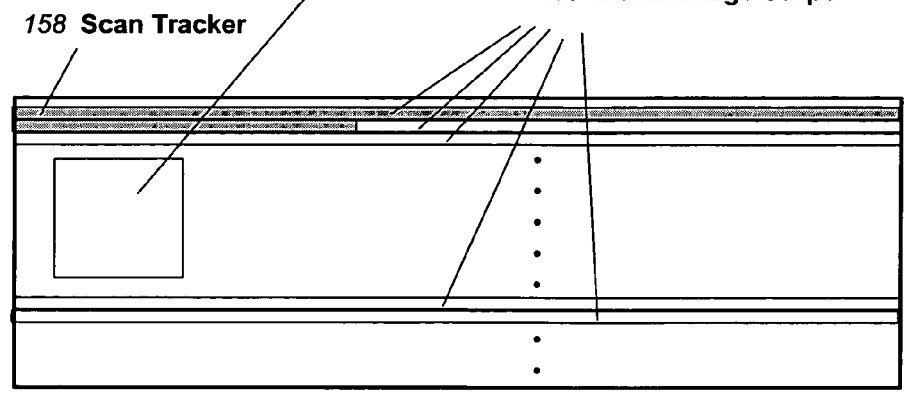

Turning now to FIGS. 6A-6B, a schematic of a dynamic image viewing frame 150 which represents a graphical user interface according to the present invention for dynamically displaying the image 76 on the display monitor 46 for purposes of interactive reviewing the image 76 as per step 216. The method of interactively reviewing the image 76 is intended to offer a digital imaging alternative to manually scanning the sample 12 at low to moderate resolutions under a conventional microscope while at the same time viewing the optical signal through the eyepieces of the microscope. One of the objects of the presently preferred invention is to provide a means of replacing manual scanning of the sample 12 by dynamically viewing the image 76 that is a digitization of a portion of the sample 12, and preferably a diffraction-limited digitization of the sample 12, on the display monitor 46. There are many advantages to this approach, including a more comfortable and controlled viewing environment in which intelligent scanning and electronic zooming methods applied to the digital imagery data can increase the productivity of an operator charged with finding selected objects, for example abnormal cells, in the image. Specific objects that are identified can then be relocated, depending on the decision logic of steps 218 and 220, under a conventional microscope or using the scanner 11. Another advantage, afforded by the connection of the scanner 11 to the network 42, is that the dynamic review of the image 76 can be performed remotely without requiring access to the sample 12. Further, reviewing a digitized version of the sample 12, namely the image 76, lends itself to a variety of techniques for monitoring the specific areas of the image 76 that have been viewed. It is also straightforward to measure the time that the operator has spent viewing specific areas of the image 76.

The dynamic image viewing frame 150 includes the same macro image 102 within the macro window 128 as that in the previously discussed image viewing frame 100 of FIG. 5A. The dynamic image viewing frame 150 also includes the zoom image 104 within the zoom window 124 and the zoom region 106 that relates the macro image 102 to the zoom image 104, similar to the image viewing frame 100 described previously. While the size of all windows can be changed by the operator, the zoom window 124 in the dynamic image viewing frame 150 will typically be smaller than in the previously described image viewing frame 100 to allow a movie image 152 to be displayed with sufficient resolution within a movie window 154. The movie image 152 is a full resolution dynamic image that is updated, as required, to simulate scanning the image 76 at a speed and direction determined by the operator. Returning again to the example of an image, such as the image 76, that is 36,000 by 18,000 pixels, the movie image 152 could be generated by dividing the large image 76 into multiple movie image strips 156 that can be displayed at a user-selectable resolution on the display monitor 46. For example, if the desired movie image resolution is 600 by 600 pixels, then the image 76 would be divided into thirty movie image strips 156 of 600 by 36,000 pixels, or alternatively, into sixty movie image strips 156 of 600 by 18,000 pixels. The movie image strip 156 is then displayed in the movie window 154 of the dynamic image viewing frame 150 so as to simulate scanning of the image 76 of the sample 12. One way to simulate this scanning along either the x- or y-axis is to remove at least one previously shown column of pixels along one edge of the movie image 152 while adding at least one new column of image pixels along the opposing edge of the movie image 152. A series of movie images 152 that differs from each other as described can comprise the individual frames of a digital movie that is played and displayed in the movie window 154 on the display monitor 46 using conventional browser software such as Media Player from Microsoft. This type of simulated scanning is similar to what might be observed in the binoculars of a conventional microscope while manually scanning the sample 12.

One potential disadvantage of this type of simulated scanning of the image 76 of the sample 12 is that objects in the movie image 152 are typically in motion, making it more challenging for an operator to identify objects, or requiring the operator to execute multiple stop-and-go commands during the process of scanning the image 76 of the sample 12. An alternate scanning method without the negative effects of motion can also be achieved with the scanner 11. This alternate process comprises dividing the movie image strip 156 into contiguous image fields of, for example, 600 by 600 pixels each, and then displaying these contiguous images one at a time, preferably with some overlap between images, as a series of movie images 152. The specific reference to a 600 by 600 pixel image is only meant to illustrate the principles of the idea, as images of other size can also be used. It should be apparent that there are many methods for dynamically reviewing the image 76 that provide an advantage over viewing the sample 12 on a conventional microscope. A scan tracker 158 could be shown on the macro image 102 itself to indicate those regions of the image 76 that have previously been viewed as movie images 152. Since the operator can control the speed of the simulated scanning of the image 76, the operator may spend more time on some areas than on others. The scan tracker 158 could be color coded, for example, to indicate relative dwell times, providing immediate feedback to the operator regarding the thoroughness of the review of the image 76. Other more advanced simulated image scanning methods are also possible. For example, specialized computer algorithms might rank areas of the image 76 in terms of their importance and present the movie images 152 according to such relative importance criteria. For sparse images, empty areas could be skipped entirely, making the operator more efficient by not requiring viewing of essentially blank fields on the image 76. Specialized computer algorithms could be employed to eliminate from the movie image 152 certain elements of the image 76. For example, clutter or objects or cells that may not be important for the analysis of image 76, or may not be relevant in making a diagnosis associated with image 76, could be eliminated from the image 76 prior to the display of the movie image 152. Ergonomic controllers such as joysticks, trackballs, gamepads, or footpedals could also be utilized to provide further performance improvements over clicking and pointing icons or buttons in the user commands window 126 of the dynamic image viewing frame 150. Examples of functions that could be useful to dynamically review the image 76 include functions such as forward play, backward play, fast forward, rewind, pause, loop, and other functions similar to what can be found in a conventional video playing or editing environment. It should also be realized that depending on the circumstances, there may be a need to store individual image frames, object coordinates, or other data for future reference or subsequent review of the image 76.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method for creating a contiguous digital image of a portion of a microscope sample, comprising:

accelerating a microscope sample along a first path to a substantially constant velocity relative to a line scan camera having a linear field of view and a data read rate;

synchronizing the data read rate to the velocity of the microscope sample;

acquiring first image data from the line scan camera while the data read rate and the velocity are synchronized;

decelerating the microscope sample to a substantially complete stop, wherein said deceleration desynchronizes the data read rate and the velocity;

storing the first image data as a first strip of contiguous image data;

accelerating the microscope sample along a second path to the substantially constant velocity relative to the line scan camera, wherein the second path is substantially parallel to the first path;

synchronizing the data read rate to the velocity of the microscope sample;

acquiring second image data from the line scan camera while the data read rate and the velocity are synchronized;

decelerating the microscope sample to a substantially complete stop, wherein said deceleration desynchronizes the data read rate and the velocity;

storing the second image data as a second strip of contiguous image data;

composing the first strip of contiguous image data and the second strip of contiguous image data into a contiguous digital image of a portion of the microscope sample.

2. The method of claim 1, further comprising pre-scanning the microscope sample and mapping optimal focus as a function of X-Y location on the microscope sample, wherein each aquiring step further comprises adjusting the focus of the line scan camera in accordance with the pre-scanned focus map.

3. The method of claim 1, wherein the digital image of the first strip has a first length and a first width and the digital image of the second strip has a second length and a second width, and wherein the first length and the second length are not equal.

4. The method of claim 3, wherein the first width and the second width are not equal.

5. The method of claim 1, wherein the first strip comprises a first perimeter edge of the sample and a first opposing perimeter edge of the sample, wherein the first perimeter edge and the first opposing perimeter edge are separated by at least 2 micrometers.

6. The method of claim 5, wherein the second strip comprises a second perimeter edge of the sample and a second opposing perimeter edge of the sample, wherein the second perimeter edge and the second opposing perimeter edge are separated by at least 2 micrometers.

7. The method of claim 1, wherein the microscope sample is moved in a first direction along the first path to scan the first strip and the microscope sample is moved in a second direction along the second path to scan the second strip.

8. A method for creating a contiguous digital image of a portion of a microscope sample, comprising:

moving a microscope sample along a first path at substantially constant velocity relative to a line scan camera having a linear field of view;

stopping the microscope sample movement along the first path relative to the line scan camera;

acquiring image data from the line scan camera as a first plurality of adjacent lines of image data, wherein said acquiring of image data takes place after the microscope sample begins moving along the first path and before the microscope sample stops moving along the first path;

storing the first plurality of adjacent lines of image data as a first strip of contiguous image data;

moving the microscope sample along a second path at substantially constant velocity relative to a line scan camera having a linear field of view, wherein said second path is substantially parallel to said first path;

stopping the microscope sample movement along the second path relative to the line scan camera;

acquiring image data from the line scan camera as a second plurality of adjacent lines of image data, wherein said acquiring of image data takes place after the microscope sample begins moving along the second path and before the microscope sample stops moving along the second path;

storing the second plurality of adjacent lines of image data as a second strip of contiguous image data, wherein the second strip of image data partially overlaps the first strip of image data and wherein the digital image of the first strip has a first length and a first width and the digital image of the second strip has a second length and a second width and the first length and the second length are not equal;

composing the first strip of contiguous image data and the second strip of contiguous image data into a contiguous digital image of a portion of the microscope sample.

9. The method of claim 8, further comprising adjusting the focus of the line scan camera while acquiring image data.

10. A method for creating a contiguous digital image of a portion of a microscope sample, comprising:

moving a microscope sample along a first path at substantially constant velocity relative to a line scan camera having a linear field of view;

stopping the microscope sample movement along the first path relative to the line scan camera;

acquiring image data from the line scan camera as a first plurality of adjacent lines of image data, wherein said acquiring of image data takes place after the microscope sample begins moving along the first path and before the microscope sample stops moving along the first path;

storing the first plurality of adjacent lines of image data as a first strip of contiguous image data; p1 moving the microscope sample along a second path at substantially constant velocity relative to a line scan camera having a linear field of view, wherein said second path is substantially parallel to said first path;

stopping the microscope sample movement along the second path relative to the line scan camera;

acquiring image data from the line scan camera as a second plurality of adjacent lines of image data, wherein said acquiring of image data takes place after the microscope sample begins moving along the second path and before the microscope sample stops moving along the second path;

storing the second plurality of adjacent lines of image data as a second strip of contiguous image data, wherein the second strip of image data partially overlaps the first strip of image data and wherein the digital image of the first strip has a first length and a first width and the digital image of the second strip has a second length and a second width and wherein the first width and the second width are not equal; and composing the first strip of contiguous image data and the second strip of contiguous image data into a contiguous digital image of a portion of the microscope sample.

11. The method of claim 8, wherein the first strip comprises a first perimeter edge of the sample and a first opposing perimeter edge of the sample, wherein the first perimeter edge and the first opposing perimeter edge are separated by at least 2 micrometers.

12. The method of claim 11, wherein the second strip comprises a second perimeter edge of the sample and a second opposing perimeter edge of the sample, wherein the second perimeter edge and the second opposing perimeter edge are separated by at least 2 micrometers.

13. The method of claim 8, wherein the microscope sample is moved in a first direction along the first path to scan the first strip and the microscope sample is moved in a second direction along the second path to scan the second strip.

14. A system for creating a contiguous digital image of a portion of a microscope sample, comprising:
- a motorized stage configured to support a microscope sample and move the microscope sample at a substantially constant velocity;
- an illumination system configured to illuminate a portion of the microscope sample;
- an objective lens positioned for viewing the illuminated portion of the microscope sample while the sample is moving at substantially constant velocity;
- a prism positioned to split an optical signal from the objective lens into a plurality of color channels;
- a plurality of time delay integration (TDI) line scan cameras each comprising a plurality of light responsive elements arranged in a linear array, whereby each TDI array is positioned to receive the optical signal for one of the plurality of color channels; and
- a data processor configured to processes the light intensities from the plurality of light responsive elements for each of the TDI arrays to create a digital image strip of a portion of the microscope sample, the data processor further configured to assemble and store a plurality of digital image strips into a contiguous digital image of a portion of the microscope sample.

15. The system of claim 14, wherein the motorized stage comprises at least one stepper motor.

16. The system of claim 14, wherein the motorized stage comprises at least one servo motor.

17. The system of claim 14, wherein the motorized stage comprises a first motor configured to move the microscope sample in a first direction and a second motor configured to move the microscope sample in a second direction, wherein the second direction is orthogonal to the first direction.

18. The system of claim 14, further comprising a piezo positioner connected to the objective lens, whereby the data processor directs the piezo positioner to adjust the position of the objective lens for focus.

19. The system of claim 14, further comprising a data storage area communicatively coupled to the data processor, the data processor further configured to store the contiguous digital image of a portion of the microscope sample in the data storage area.

20. The system of claim 14, wherein the illumination system is optimized for fluorescence mode optical microscopy.

21. The system of claim 14, wherein the illumination system is optimized for transmission mode optical microscopy.

22. The system of claim 14, wherein the illumination system is optimized for reflection mode optical microscopy.

23. The system of claim 14, wherein the illumination system is optimized for bright-field optical microscopy.

24. The method of claim 1, wherein the line scan camera comprises a time delay integration (TDI) line scan camera comprising a plurality of light responsive elements arranged in a linear array.

25. The method of claim 24, further comprising splitting an optical signal to be read by the TDI array into a plurality of color channels.

26. The method of claim 25, further comprising positioning a TDI array to receive the optical signal for each of the color channels.

* * * * *

UNITED STATES PATENT AND TRADEMARK OFFICE
CERTIFICATE OF CORRECTION

PATENT NO.         : 7,457,446 B2
APPLICATION NO. : 11/173818
DATED                  : November 25, 2008
INVENTOR(S)        : Dirk G. Soenksen It is certified that error appears in the above-identified patent and that said Letters Patent is hereby corrected as shown below:

Col. 26, Claim 10, line 14, delete "p1" and move "moving the microscope sample along a second path at substantially constant velocity relative to a line scan camera having a linear field of view, wherein said second path is substantially parallel to said first path;" to line 15.

Signed and Sealed this

Thirtieth Day of June, 2009

JOHN DOLL
*Acting Director of the United States Patent and Trademark Office*

(12) INTER PARTES REEXAMINATION CERTIFICATE (1231st)
United States Patent
Soenksen

(10) Number: US 7,457,446 C1
(45) Certificate Issued: Feb. 12, 2016

(54) FULLY AUTOMATIC RAPID MICROSCOPE SLIDE SCANNER

(75) Inventor: Dirk G. Soenksen, Carlsbad, CA (US)

(73) Assignee: APERIO TECHNOLOGIES, INC., Vista, CA (US)

Reexamination Request:
No. 95/000,518, Nov. 23, 2009

Reexamination Certificate for:
Patent No.: 7,457,446
Issued: Nov. 25, 2008
Appl. No.: 11/173,818
Filed: Jul. 1, 2005

Certificate of Correction issued Jun. 30, 2009

Related U.S. Application Data

(63) Continuation of application No. 10/798,457, filed on Mar. 11, 2004, now Pat. No. 6,917,696, which is a continuation of application No. 09/563,437, filed on May 3, 2000, now Pat. No. 6,711,283.

(51) Int. Cl.
*G06K 9/00* (2006.01)
*G02B 21/32* (2006.01)

(52) U.S. Cl.
CPC .. *G06K 9/00* (2013.01); *G02B 21/32* (2013.01)

(58) Field of Classification Search
None
See application file for complete search history.

(56) References Cited

To view the complete listing of prior art documents cited during the proceeding for Reexamination Control Number 95/000,518, please refer to the USPTO's public Patent Application Information Retrieval (PAIR) system under the Display References tab.

*Primary Examiner* — Joseph R Pokrzywa

(57) ABSTRACT

Apparatus for and method of fully automatic rapid scanning and digitizing of an entire microscope sample, or a substantially large portion of a microscope sample, using a linear array detector synchronized with a positioning stage that is part of a computer controlled microscope slide scanner. The invention provides a method for composing the image strips obtained from successive scans of the sample into a single contiguous digital image. The invention also provides a method for statically displaying sub-regions of this large digital image at different magnifications, together with a reduced magnification macro-image of the entire sample. The invention further provides a method for dynamically displaying, with or without operator interaction, portions of the contiguous digital image. In one preferred embodiment of the invention, all elements of the scanner are part of a single-enclosure that has a primary connection to the Internet or to a local intranet. In this embodiment, the preferred sample type is a microscope slide and the illumination and imaging optics are consistent with transmission mode optics optimized for diffraction-limited digital imaging.

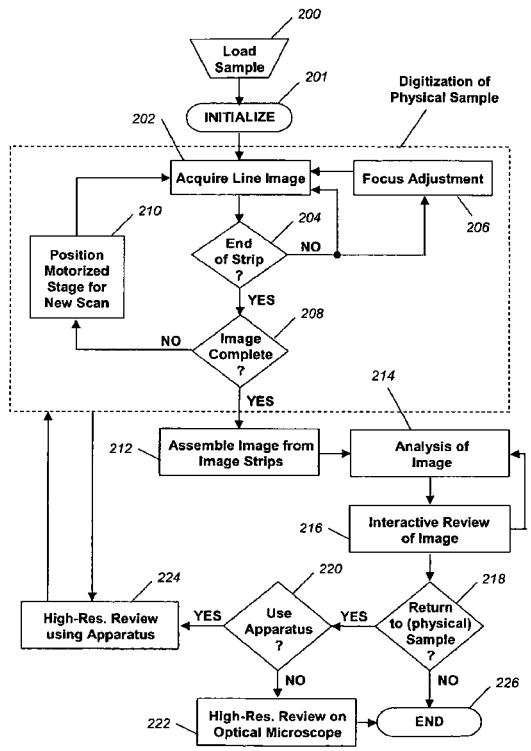

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 14, 15, 17 and 19-23 are cancelled.

Claim 1 is determined to be patentable as amended.

Claims 5-7 and 24-26, dependent on an amended claim, are determined to be patentable.

Claims 3, 4, 8-13, 16 and 18 were not reexamined.

1. A method for creating a contiguous digital image of a portion of a microscope sample, comprising:
   *pre-scanning the microscope sample and mapping optimal focus as a function of X-Y location on the microscope sample;*
   accelerating a microscope sample along a first path to a substantially constant velocity relative to a line scan camera having a linear field of view and a data read rate;
   synchronizing the data read rate to the velocity of the microscope sample;
   acquiring first image data from the line scan camera while the data read rate and the velocity are synchronized;
   decelerating the microscope sample to a substantially complete stop, wherein said deceleration desynchronizes the data read rate and the velocity;
   storing the first image data as a first strip of contiguous image data;
   accelerating the microscope sample along a second path to the substantially constant velocity relative to the line scan camera, wherein the second path is substantially parallel to the first path;
   synchronizing the data read rate to the velocity of the microscope sample;
   acquiring second image data from the line scan camera while the data read rate and the velocity are synchronized;
   decelerating the microscope sample to a substantially complete stop, wherein said deceleration desynchronizes the data read rate and the velocity;
   storing the second image data as a second strip of contiguous image data;
   composing the first strip of contiguous image data and the second strip of contiguous image data into a contiguous digital image of a portion of the microscope sample*;*
   *wherein each acquiring step further comprises adjusting the focus of the line scan camera in accordance with the pre-scanned focus map.*

* * * * *